(12) United States Patent
Polk, Jr.

(10) Patent No.: US 7,980,042 B2
(45) Date of Patent: Jul. 19, 2011

(54) MOLDED PANEL, MOLDED PANEL SYSTEM AND CONNECTION SYSTEM

(75) Inventor: Dale E. Polk, Jr., Titusville, FL (US)

(73) Assignee: LRM Industries International Inc., Rockledge, FL (US)

( * ) Notice: Subject to any disclaimer, the term of this patent is extended or adjusted under 35 U.S.C. 154(b) by 1275 days.

(21) Appl. No.: 11/602,780

(22) Filed: Nov. 21, 2006

(65) Prior Publication Data

US 2007/0164481 A1 Jul. 19, 2007

Related U.S. Application Data

(60) Provisional application No. 60/759,364, filed on Jan. 17, 2006.

(51) Int. Cl.
*E04B 5/02* (2006.01)
*E04B 5/12* (2006.01)

(52) U.S. Cl. ............ 52/587.1; 52/583.1; 52/582.1; 52/463; 52/745.16; 52/745.15; 403/252; 403/253

(58) Field of Classification Search ........... 52/584.1, 52/582.1, 587.1, 582.2, 583.1, 403.1, 463, 52/745.16, 745.15, 745.05; 403/252, 253, 403/257, 259
See application file for complete search history.

(56) References Cited

U.S. PATENT DOCUMENTS

| | | | | |
|---|---|---|---|---|
| 3,343,324 A | * | 9/1967 | Gordon | 52/396.1 |
| 3,879,916 A | * | 4/1975 | Bigham | 52/463 |
| 4,274,626 A | * | 6/1981 | Grosser et al. | 482/23 |
| 4,435,935 A | * | 3/1984 | Larrea | 52/461 |
| 4,662,138 A | * | 5/1987 | Bryant | 52/282.4 |
| 4,700,517 A | * | 10/1987 | Stohr | 52/241 |
| 4,740,654 A | * | 4/1988 | Lindgren | 174/371 |
| 4,761,927 A | * | 8/1988 | O'Keeffe et al. | 52/396.06 |
| 4,858,401 A | | 8/1989 | Thorp et al. | |
| 5,263,289 A | | 11/1993 | Boyd | |
| 5,483,776 A | | 1/1996 | Poppe | |
| 5,800,757 A | | 9/1998 | Abrams et al. | |
| 5,904,015 A | | 5/1999 | Chen | |
| 6,185,878 B1 | * | 2/2001 | Bullard et al. | 52/79.5 |
| 6,189,289 B1 | | 2/2001 | Quaglia et al. | |
| 6,226,944 B1 | * | 5/2001 | Peshkam et al. | 52/309.8 |

(Continued)

OTHER PUBLICATIONS

SOUTHCO Dual Lock Butt-Joint Panel Fastener Product Literature; Printed from Web Site: www.southco.com/resources/documents/r2-r5.en.pdf on Nov. 15, 2006.

*Primary Examiner* — Phi Dieu Tran A

(74) *Attorney, Agent, or Firm* — Michael A. Ervin; M. A. Ervin & Associates

(57) ABSTRACT

A molded panel is provided, which includes a body and a plurality of supporting members. The body includes a generally planar top surface and a bottom surface. The supporting members extend from the bottom surface of the body to define a support structure. The support structure includes a top surface adjacent to the bottom surface of the body, a generally planar bottom surface and at least one edge extending therebetween. The support structure also includes at least one channel extending along a central x-axis of the support structure, and at least one additional channel intersecting the at least one central channel and extending along a y-axis of the support. The y-axis is generally perpendicular to the x-axis. A connection system for the molded panel, systems including the molded panel, and methods related to the molded panel are also described.

6 Claims, 26 Drawing Sheets

U.S. PATENT DOCUMENTS

| | | |
|---|---|---|
| 6,370,831 B1 | 4/2002 | Marshall et al. |
| 6,634,149 B2 * | 10/2003 | Cates et al. ............ 52/283 |
| 6,668,514 B2 * | 12/2003 | Skov ............ 52/782.1 |
| 6,719,551 B2 | 4/2004 | Polk, Jr. |
| 6,869,558 B2 | 3/2005 | Polk, Jr. et al. |
| 7,003,863 B2 * | 2/2006 | Skov et al. ............ 29/453 |
| 7,621,091 B2 * | 11/2009 | Dickey et al. ............ 52/582.2 |
| 7,707,783 B2 * | 5/2010 | Mower et al. ............ 52/79.1 |
| 2004/0253429 A1 | 12/2004 | Polk, Jr. et al. |
| 2004/0253430 A1 | 12/2004 | Polk, Jr. et al. |
| 2006/0000167 A1 | 1/2006 | Nakaki et al. |
| 2006/0008967 A1 | 1/2006 | Polk, Jr. et al. |

* cited by examiner

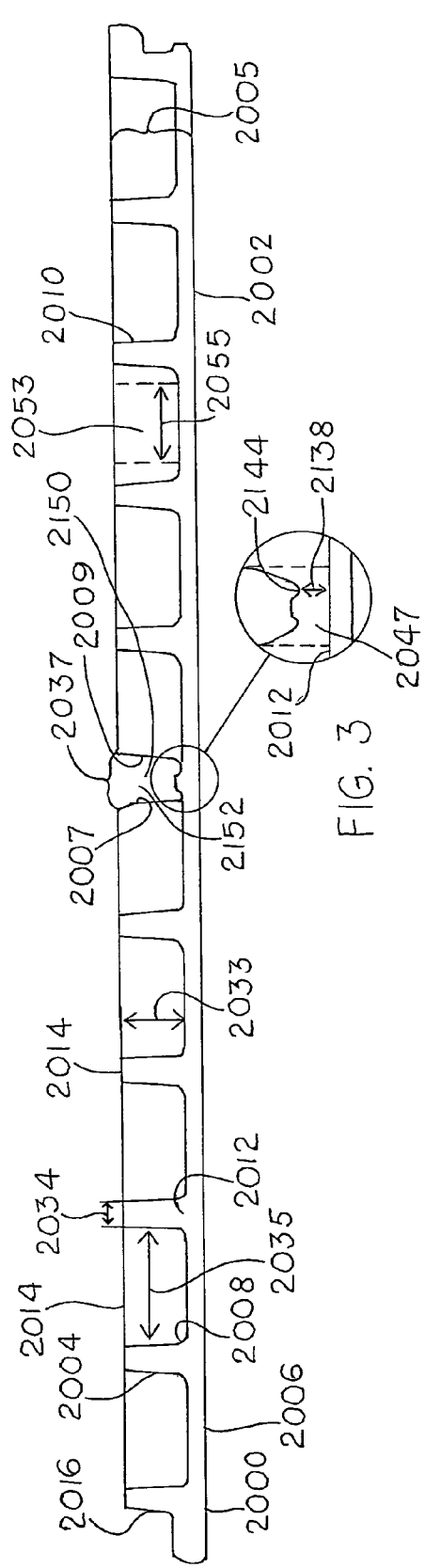
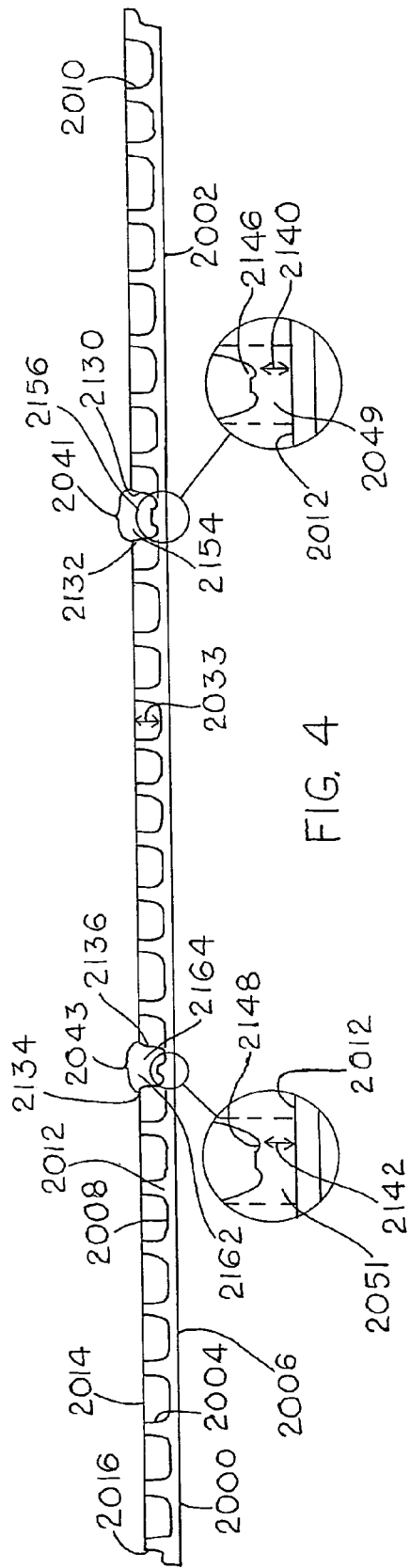

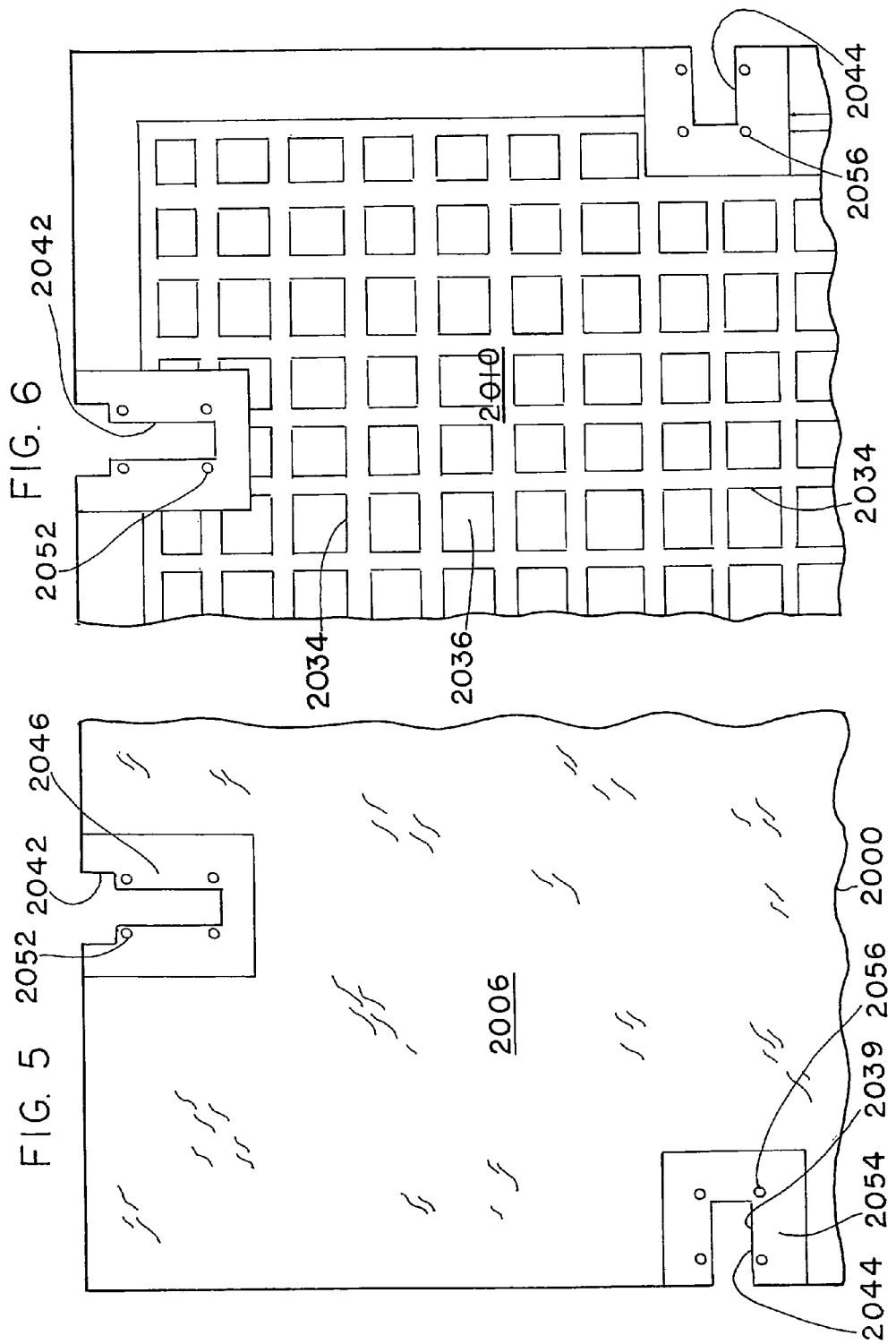

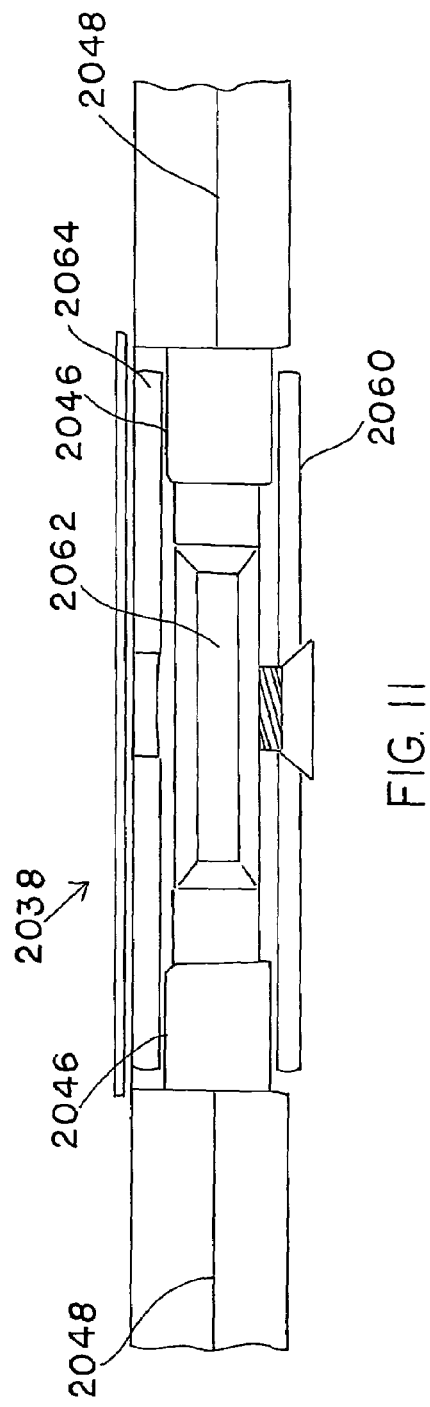
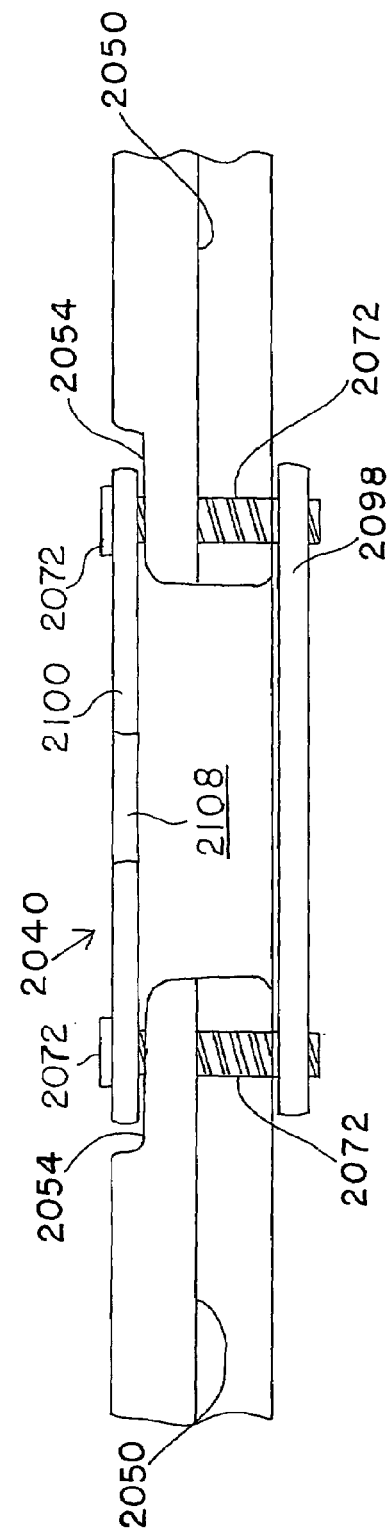
FIG. 11
FIG. 12

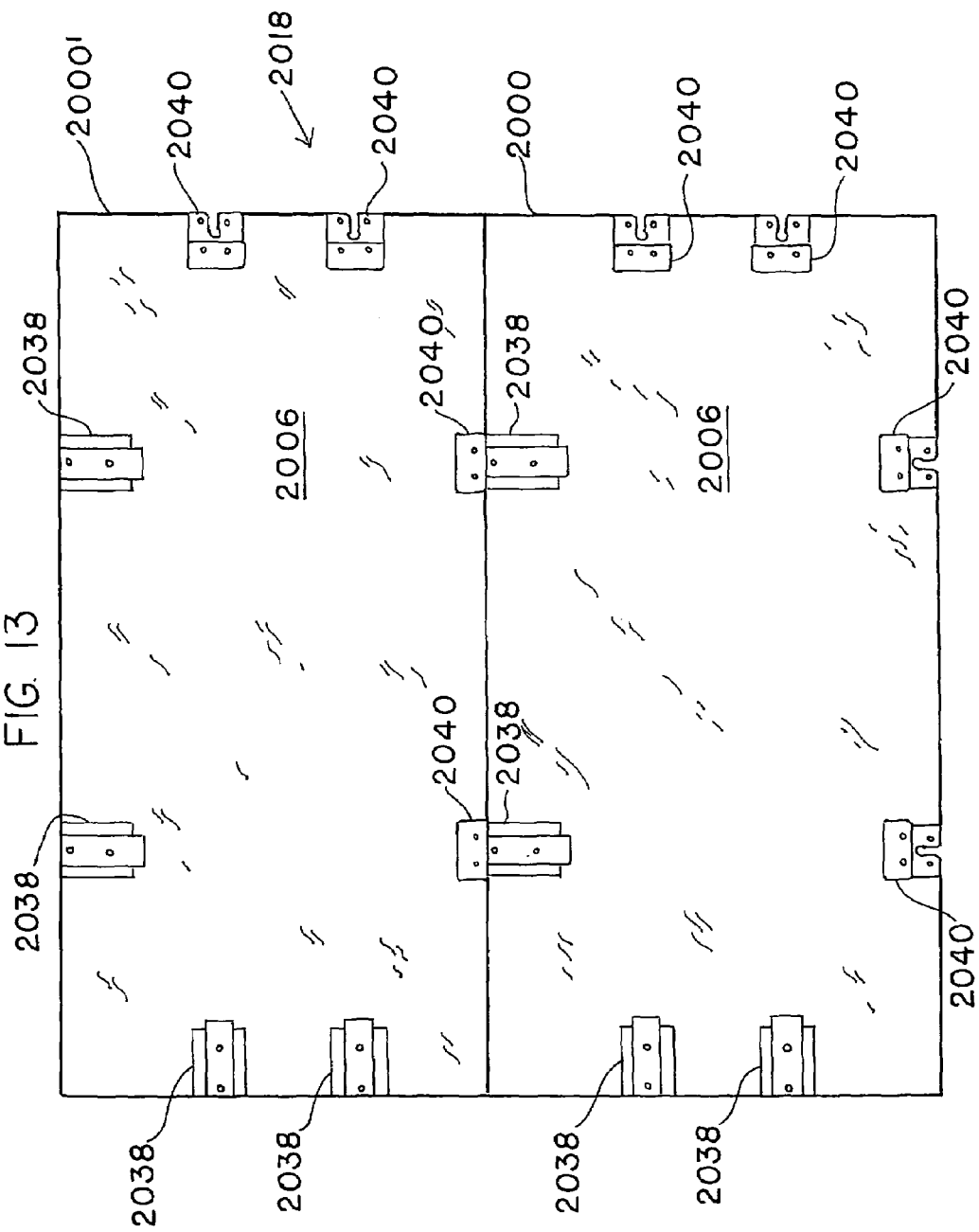

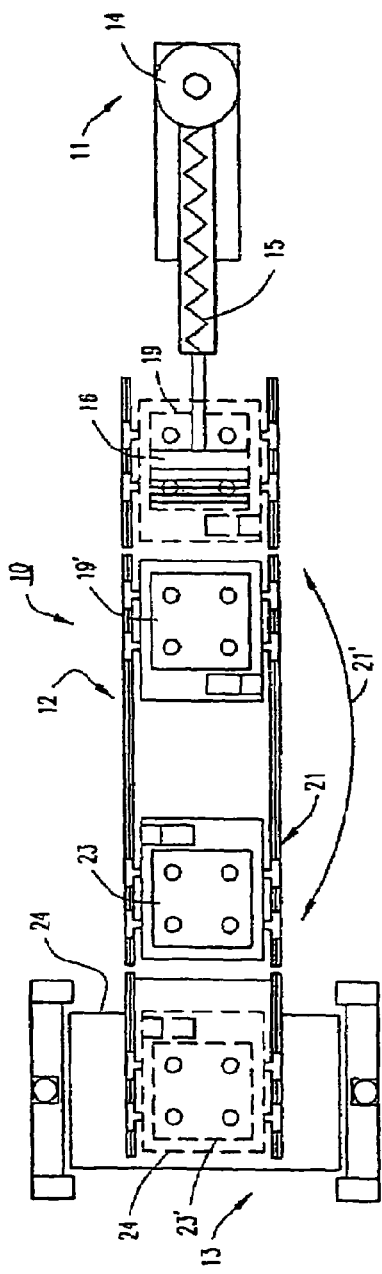
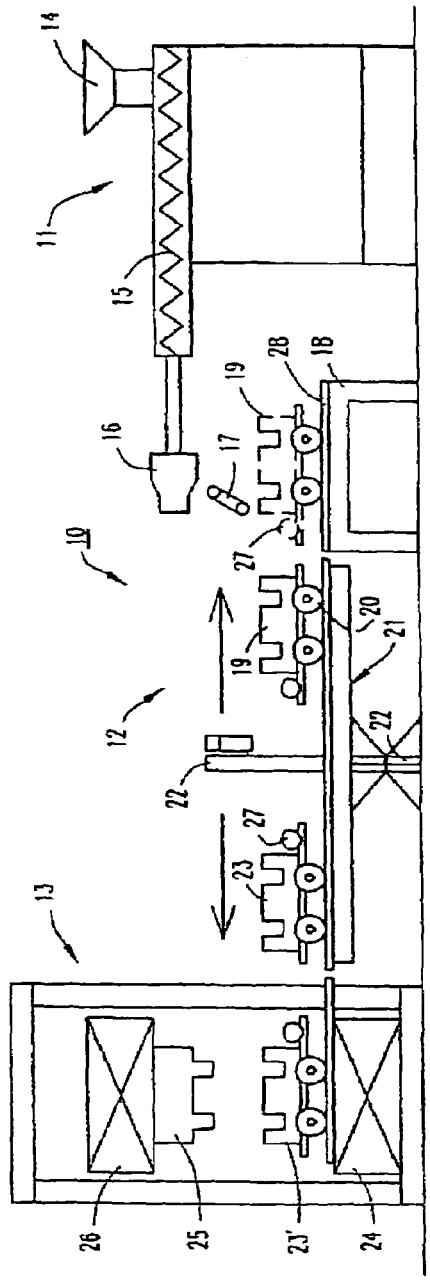
FIG. 18
FIG. 19

MOLDED PANEL, MOLDED PANEL SYSTEM AND CONNECTION SYSTEM

CROSS REFERENCE TO RELATED PATENT APPLICATION

The present non-provisional patent application is entitled to and claims, under 35 U.S.C. §119(e), the benefit of U.S. Provisional Patent Application No. 60/759,364, filed Jan. 17, 2006, which is hereby incorporated herein in its entirety by reference.

FIELD OF THE INVENTION

The present invention relates, in general, to a molded panel and, more particularly, to a molded thermoplastic floor, ceiling or wall panel.

BACKGROUND OF THE INVENTION

Various systems for molding thermoplastic materials into a variety of forms are known. For example, U.S. Pat. Nos. 6,900,547, 6,869,558, 6,719,551 and U.S. Patent Application Publication No. 2004/0253429, each to Polk, Jr. et al., disclose a thermoplastic molding system including a thermoplastic extrusion die for the extrusion of a thermoplastic slab profiled by adjustable die gate members. The adjustable die gate members are dynamic die settings for varying the thickness of the extruded material in different parts of the extruded slab. The thermoplastic extrusion die has a trimmer for cutting the extruded thermoplastic slab from the thermoplastic extrusion die. A plurality of thermoplastic molds, which may be either vacuum or compression molds, are each mounted on a movable platform for moving one mold at a time into a position to receive a thermoplastic slab being trimmed from the thermoplastic extrusion die. A molded part is formed with a variable thickness from a heated slab of thermoplastic material being fed still heated from the extrusion die.

Such molding systems have been previously used to mold various parts such as pallets, beams and backboards. However, the use of such a molding system to produce large panels for use as flooring, floor coverings, walls, wall coverings, ceilings and ceiling coverings has been limited due to the fact that such large panels made according to above-described method are prone to warpage.

In order to overcome this limitation of thermoplastic parts, large structural components are often constructed from concrete, steel, wood and other various materials. However, each of these materials suffers from a variety of limitations when used to construct structural components. For example, precast concrete structural components are extremely heavy, bulky, costly and difficult to transport to the site of construction due in part to their bulkiness and heavy weight. In addition to construction and shipping difficulties with concrete structural components, the low tensile strength of concrete can result in failures in such components. Reinforcement is often required in such concrete structural components when subjected to large loads, thereby increasing the cost to manufacture such components.

Steel structural components also suffer from various deficiencies. For example, steel is quite heavy and costly to ship and can share construction difficulties with concrete as described.

Structural components built from wood also have a variety of limitations. Wood components are susceptible to environmental attacks, especially rot from weather and termites. In such environments, wood encounters a drastic reduction in strength, which compromises the integrity of the structure.

Accordingly, a need exists for a structural panel that is low-cost, lightweight and easily assembled. A further need exists for a process for forming such panels that allows for panels with a large size to be manufactured easily. A need also exists for a structural panel that has high warpage resistance and resistance to heavy traffic.

SUMMARY OF THE INVENTION

The present invention provides a molded panel including a body and a plurality of supporting members. The body comprises a generally planar top surface and a bottom surface. A plurality of supporting members extend from the bottom surface of the body to define a support structure comprising a top surface adjacent to the bottom surface of the body, a generally planar bottom surface and at least one edge extending therebetween. At least one central channel extends along a central x-axis of the support structure from a first portion of the edge to a second, opposing portion of the edge along the x-axis, and at least one additional channel intersects the at least one central channel and extends along a y-axis of the support structure from a third portion of the edge to a fourth, opposing portion of the edge along the y-axis. The y-axis is generally perpendicular to the x-axis.

In another aspect, the present invention provides a connection system including a connecting member, a receiving member and a fastening member for connecting the connecting member and the receiving member together, thereby inhibiting relative movement thereof. The connecting member comprises (1) a first plate having a hole proximate a first end of the first plate, (2) a support plate positioned generally parallel to the first plate and having a first hole located in a central region of the support plate such that the first hole is generally aligned with the hole of the first plate, and a second hole spaced apart from the first hole proximate a first end of the support plate and a (3) top plate positioned generally parallel to the support plate and having (a) a first hole located in a central region of the top plate such that the first hole of the top plate is generally aligned with the first hole of the support plate and the hole of the first plate, and (b) a second hole spaced apart from the first hole of the top plate proximate a first end of the top plate and generally aligned with the second hole of the support plate. The receiving member comprises a first plate having a hole located in a central region thereof and a second plate positioned generally planar to but spaced apart from the first plate. The second plate has a slot extending from a first end of the second plate into a central region of the second plate such that at least a portion of the slot in the central region of the second plate is generally aligned with the hole in the central region of the first plate. The support plate of the connecting member is positioned between the first plate and the second plate of the receiving member such that the second hole of the support plate and the second hole of the top plate of the connecting member are aligned with the hole of the first plate of the receiving member and a portion of the slot of the second plate of the receiving member in the central region of the second plate of the receiving member, thereby allowing the fastening member to be inserted through the holes and slot to inhibit relative movement of the connecting member and the receiving member in a plane generally parallel to the plates.

In another aspect, the present invention provides a panel system comprising at least two molded panels and a connection system disposed with a portion of each of the at least two panels. Each panel comprises a body and a plurality of supporting members. The body comprises a generally planar top surface and a bottom surface. A plurality of supporting members extend from the bottom surface of the body to define a support structure comprising a top surface adjacent to the bottom surface of the body, a generally planar bottom surface and at least one edge extending therebetween. The panel further comprises at least one central channel extending along a central x-axis of the support structure from a first portion of the edge to a second, opposing portion of the edge along the x-axis, and at least one additional channel intersecting the at least one central channel and extending along a y-axis of the support structure from a third portion of the edge to a fourth, opposing portion of the edge along the y-axis. The y-axis is generally perpendicular to the x-axis. The at least two panels are interconnected by a connection system, for example such as is described above.

In another aspect, the present invention provides a process for preparing a molded thermoplastic panel that comprises the steps of feeding a molten thermoplastic material into a mold adapted to form the panel and applying pressure to the thermoplastic material to form the panel as described in detail above.

In another aspect, the present invention provides a method of connecting molded thermoplastic panels. The method comprises the steps of providing at least two panels with a first panel comprising at least one connecting member and a second panel comprising at least one receiving member, aligning the connecting member and receiving member and fastening a connecting member such that a support plate of the connecting member is positioned between a first plate and a second plate of the receiving member such that a second hole of a support plate and a second hole of a top plate of the connecting member are aligned with a hole of the first plate of the receiving member and a portion of a slot of the second plate of the receiving member in a central region of the second plate of the receiving member thereby allowing a fastening member to be inserted through the holes and slot to inhibit relative movement of the connecting member and the receiving member in a plane generally parallel to the plates. Each panel is as described above. The at least two panels can be interconnected by a connection system, such as is described above.

Further details and advantages of the present invention will become apparent upon reading the following detailed description in conjunction with the accompanying drawings.

BRIEF DESCRIPTION OF THE DRAWINGS

FIG. 3 is a cross-sectional view of the molded panel of FIG. 2, taken along lines 3-3 of FIG. 2;

FIG. 4 is a cross-sectional view of the molded panel of FIG. 2, taken along lines 4-4 of FIG. 2

FIG. 5 is a top plan view of a portion of a panel in accordance with the present invention showing notches in the sides of the panel for receiving a connecting member and a receiving member;

FIG. 6 is a bottom plan view of the panel portion of FIG. 5;

FIG. 11 is a side elevational view of a portion of the panel of FIG. 1 showing a connecting member;

FIG. 12 is a side elevational view of a portion of the panel of FIG. 1 showing a receiving member;

FIG. 13 is a top plan view showing two connected panels in accordance with the present invention;

FIG. 18 is a top plan view of a molding system used to mold a panel in accordance with the present invention;

FIG. 19 is a side elevation view of the molding apparatus of FIG. 18;

In FIGS. 1 through 36 like reference numerals designate the same components and structural features, unless otherwise indicated.

DETAILED DESCRIPTION OF THE INVENTION

Figure 1:
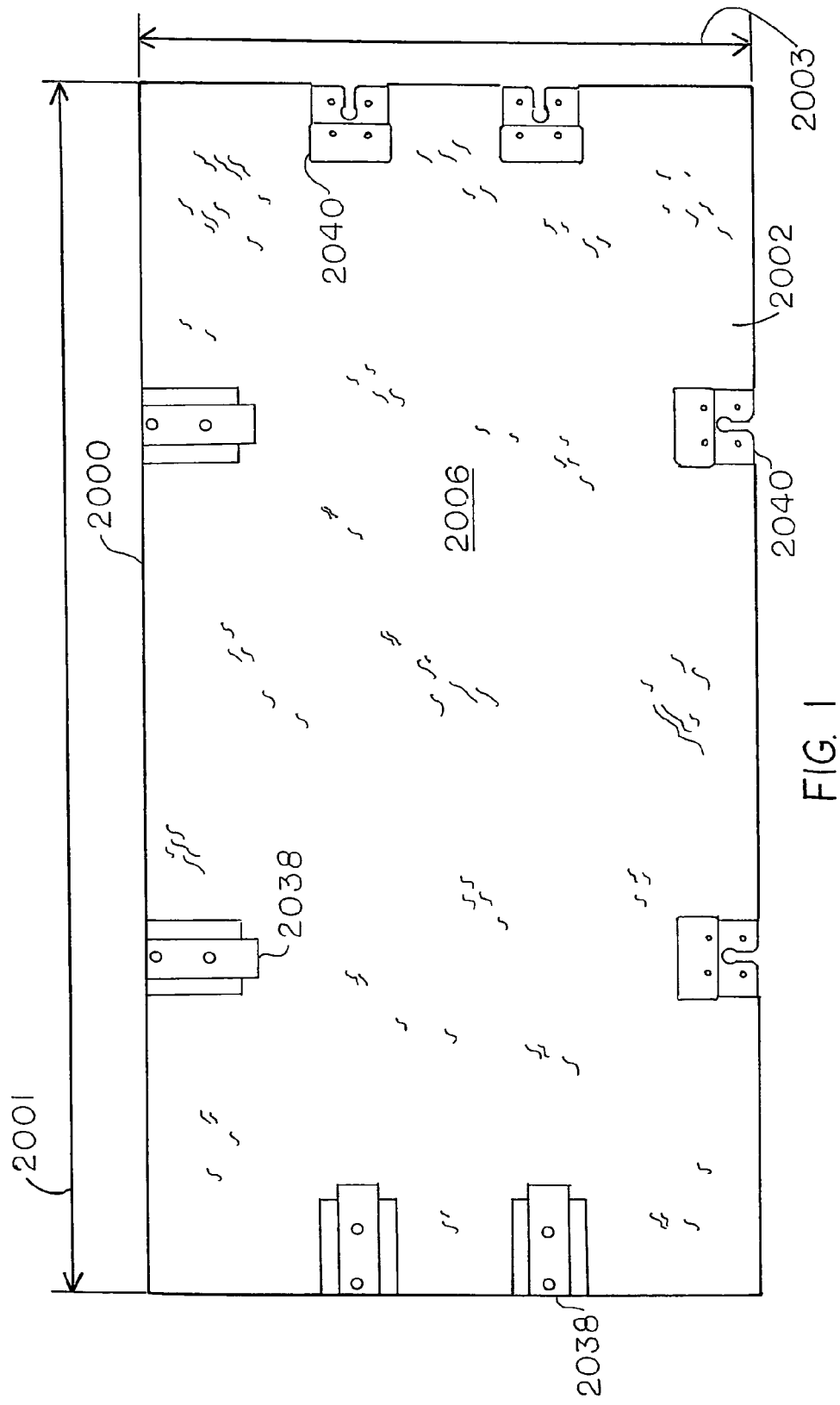
FIG. 1 is a top plan view of a molded panel in accordance with the present invention.

In its many embodiments, the present invention provides molded panels, connector systems, panel systems and methods of forming such panels and assembling such systems. The panels and panel systems of the present invention can be useful as, for example, flooring, floor coverings, walls, wall coverings, ceilings, ceiling coverings, structural building parts, ground coverings, tarmacs and temporary road systems. The panels and panel systems of the present invention are light-weight, can be manufactured easily and at low cost, and can be easily assembled. Further, the process for forming such panels allows for panels of a large size to be manufactured easily. The panels and panel systems of the present invention have good warpage resistance and resistance to heavy duty traffic. When used to cover soft ground or earth, the pattern of protruding members on the underside of the panels of the present invention can embed into the ground and provide a covering surface or road having good structural integrity and less likelihood of lateral slippage of the panels.

For the purpose of the description hereinafter, the terms "upper", "lower", "inner", "outer", "right", "left", "vertical", "horizontal", "top", "bottom", and derivatives thereof, shall relate to the invention as oriented in the drawing Figures. However, it is to be understood that the invention may assume alternate variations and step sequences except where expressly specified to the contrary. It is also to be understood that the specific devices and processes, illustrated in the attached drawings and described in the following specification, is an exemplary embodiment of the present invention. Hence, specific dimensions and other physical characteristics related to the embodiment disclosed herein are not to be considered as limiting the invention. In describing the embodiments of the present invention, reference will be made herein to the drawings in which like numerals refer to like features of the invention.

Other than where otherwise indicated, all numbers or expressions referring to quantities, distances, or measurements, etc. used in the specification and claims are to be understood as modified in all examples by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective measurement methods.

Also, it should be understood that any numerical range recited herein is intended to comprise all sub-ranges subsumed therein. For example, a range of "1 to 10" is intended to comprise all sub-ranges between and including the recited minimum value of 1 and the recited maximum value of 10; that is, having a minimum value equal to or greater than 1 and a maximum value of equal to or less than 10. Because the disclosed numerical ranges are continuous, they comprise every value between the minimum and maximum values. Unless expressly indicated otherwise, the various numerical ranges specified in this application are approximations.

With reference to FIGS. 1 through 4, a molded panel 2000 is shown which comprises a body 2002 and a plurality of supporting members 2004. Body 2002 comprises a generally planar top surface 2006 and a bottom surface 2008. The top surface of the body 2002 can be generally smooth or textured as desired to provide traction, for example. Also, the body 2002 can be colored, for example by including colorants in the molding material or coating the top surface 2006 of the body 2002, as desired.

A plurality of supporting members 2004 extend from bottom surface 2008 of body 2002 to define a support structure 2010. Support structure 2010 comprises a top surface 2012 adjacent to, or in facing engagement with, bottom surface 2008 of body, a generally planar bottom surface 2014 and at least one (one or more) edges 2016 extending therebetween.

Although panel 2000 is illustrated in the figure as being shaped as a rectangle, this is not to be construed as limiting the present invention. Other suitable shapes for panel 2000 comprise, but are not limited to, circles, squares, triangles, etc.

Referring now to FIG. 1, the mean average length 2001 of panel 2000 may, for example, range from about 0.3 meters (1 ft) to about 6.1 m (20 ft) in length. More particularly, the mean average length 2001 of panel 2000 may, for example, range from about 1.2 m (4 ft) to about 2.4 m (8 ft). In an embodiment of the present invention, the mean average length 2001 of panel 2000 is 2.4 m (8 ft).

The mean average width 2003 of panel 2000 may, for example, range from about 0.3 meters (1 ft) to about 6.1 m (20 ft). More particularly, the mean average width 2003 of panel 2000 may, for example, range from about 0.6 meters (2 ft) to about 1.2 m (4 ft). In an embodiment of the present invention, the mean average width 2003 of panel 2000 is 1.2 m (4 ft).

Referring now to FIG. 3, the mean average thickness 2005 of panel 2000 may, for example, range from about 1.3 cm (½ inch) to about 12.7 cm (5 inches). More particularly, the mean average thickness 2005 of panel 2000 may, for example, range from about 2.5 cm (1 inch) to about 7.6 cm (3 inches). In an embodiment of the present invention, the mean average thickness 2005 of panel 2000 is 2.5 cm (1 inch).

In an embodiment of the present invention, panel 2000 has dimensions of: about 122 cm (4 ft) width; by about 244 cm length (8 ft); by about 2.5 cm (1 inch) thickness.

The dimensions recited herein are not to be construed as limiting the present invention as panels with a variety of different overall dimensions can be formed in accordance with the present invention. For example, the thickness of the panel may vary across the length and width of the panel, as desired.

Figure 2:
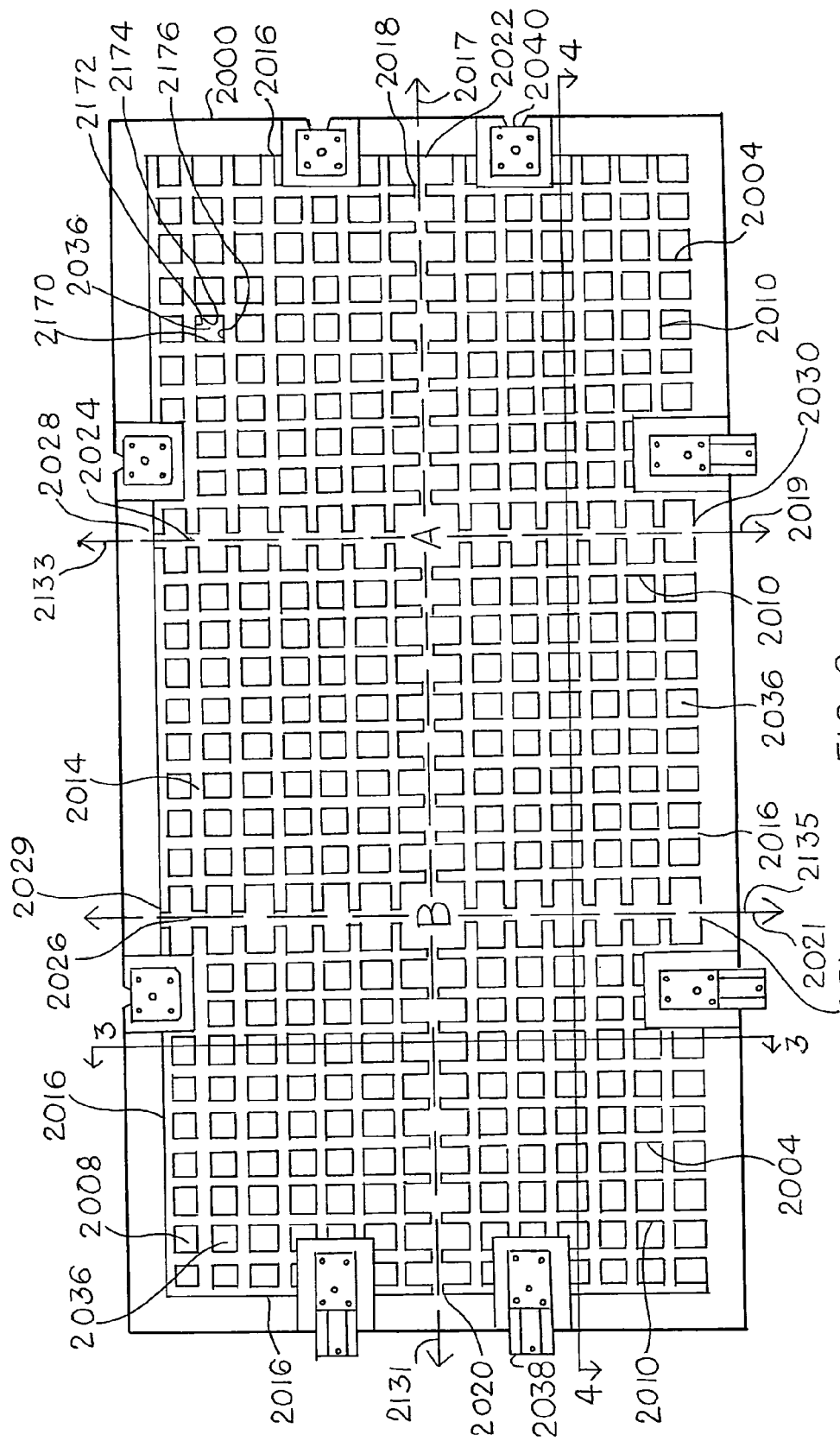
FIG. 2 is a bottom plan view of the molded panel of FIG. 1.
Figure 7A:
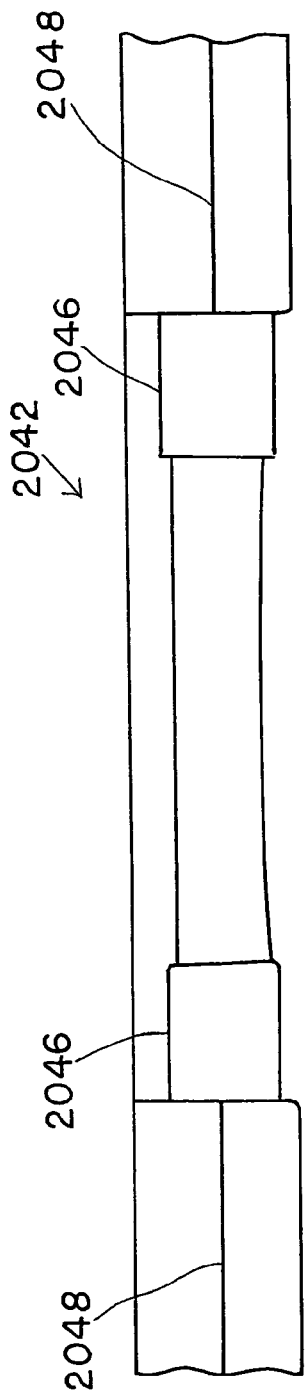
FIG. 7A is a side elevational view of a portion of a panel according to the present invention showing a notch for receiving the connecting member.
Figure 8A:
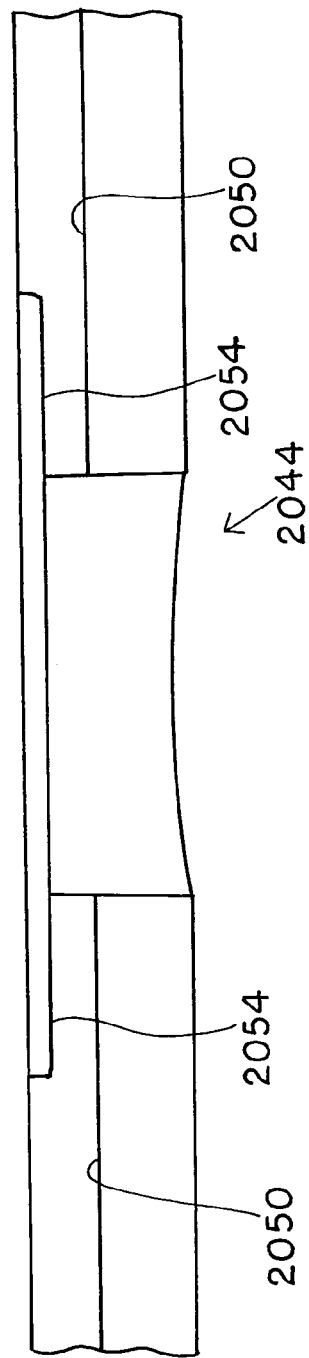
FIG. 8A is a side elevational view of a portion of a panel according to the present invention showing a notch for receiving the receiving member.
Figure 7B:
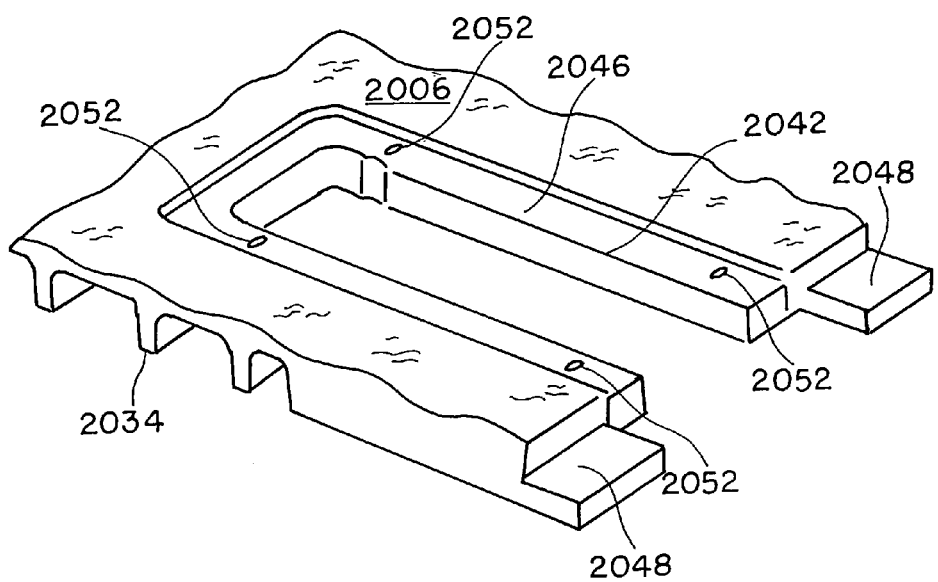
FIG. 7B is a perspective view of a portion of the panel of FIG. 7A.
Figure 8B:
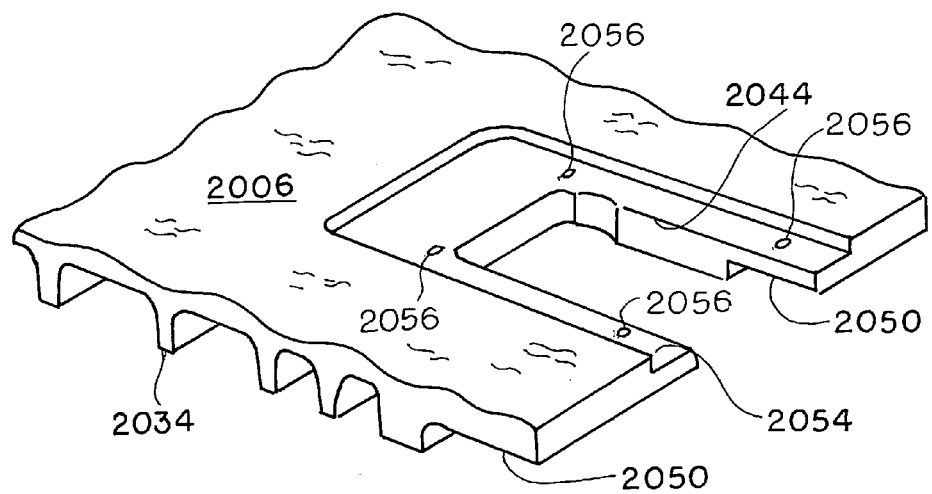
FIG. 8B is a perspective view of a portion of the panel of FIG. 8A.

Referring now to FIGS. 2 and 3, support structure 2010 of panel 2000 comprises a central channel 2018 extending along a central x-axis 2017 of support structure 2010 from a first portion 2020 of edge 2016 to a second, opposing portion 2022 of edge 2016 along x-axis 2017. As shown in FIGS. 2 and 3, the central channel 2018 can extend fully between the first portion 2020 of edge 2016 to the second, opposing portion 2022 of edge 2016 to assist in providing good resistance to warpage by permitting controlled flexing of the panel as necessary. Alternatively, a portion of the central channel 2018 can be partially closed proximate the first portion 2020 of edge 2016 and/or second, opposing portion 2022 of edge 2016.

The sides 2007, 2009 of the central channel 2018 can be generally perpendicular to the bottom surface 2014 or angled with respect to the bottom surface 2014, for example, at an angle of about 60° to about 120°. The maximum width 2037 of the channel 2018 may, for example, range from about 1.0 cm (0.4 inch) to about 2.5 cm (1 inch). In an embodiment of the present invention, the maximum width 2037 of the channel 2018 is about 1.5 cm (0.6 inch). The mean average width of the channel 2018 may, for example, range from about 1.0 cm (0.4 inch) to about 2.5 cm (1 inch). In an embodiment of the present invention, the mean average width of channel 2018 is about 1.5 cm (0.6 inch).

Referring now to FIGS. 2 and 4, support structure 2010 comprises at least one (one or more) additional channel 2024. The at least one additional channel 2024 intersects channel 2018 at region A.

In other embodiments, such as a rectangular shaped panel, support structure 2010 comprises two additional channels 2024 and 2026. Each of the two additional channels 2024 and 2026 intersect central channel 2018 at regions A and B, respectively, and extend along a y-axis 2019, 2021 of support structure 2010 from a third portion 2028, 2029 of edge 2016 to a fourth, opposing portion 2030, 2031 of edge 2016 along y-axis 2019. As shown in FIGS. 2 and 3, the additional channels 2024, 2026 can extend fully between the third portion 2028, 2029 of edge 2016 to the fourth, opposing portion 2030, 2031 of edge 2016 to assist in providing good resistance to warpage by permitting controlled flexing of the panel as necessary. Alternatively, a portion of the additional channel 2024, 2026 can be partially closed proximate the third portion 2028, 2029 of edge 2016 to the fourth, opposing portion 2030, 2031 of edge 2016.

As illustrated in FIG. 2, y-axis 2019 is generally perpendicular to the x-axis, i.e., the x-axis 2017 and y-axis 2019, 2021 intersect at an angle ranging from about 60° to about 120°. In some embodiments, the x-axis 2017 and y-axis 2019, 2021 intersect at an angle of 90°.

The respective sides 2130, 2132, 2134, 2136 of the additional channels 2024 and 2026 can be generally perpendicular to the bottom surface 2014 or angled with respect to the bottom surface 2014, for example at an angle of about 60° to about 120°. In some embodiments, the respective maximum width 2041, 2043 of the respective additional channels 2024 and 2026 can range from about 1.0 cm (0.4 inch) to about 2.5 cm (1 inch). In some embodiments, the maximum width 2041, 2043 of the respective additional channels 2024 and 2026 is about 1.5 cm (0.6 inch).

While the embodiments represented by FIGS. 1 through 4 illustrate support structure 2010 as comprising two additional channels 2024 and 2026 positioned as shown in the figures, this is not to be construed as limiting the present invention. The additional channels 2024 and 2026 can be positioned as desired to help prevent warpage of panel 2000 as will be discussed hereinafter. Therefore, the number and position of the additional channels may vary based on the shape of panel 2000. For example, a square panel may comprise only one additional channel intersecting central channel 2018 in the center of the panel. A substantially elongated panel may have three or four additional channels, for example.

The respective mean average thickness 2138, 2140, 2142 of support structure 2010 between an apex 2144, 2146, 2148 of one of channels 2018, 2024 and/or 2026 and top surface 2012 of support structure 2010 is typically less than a mean average thickness 2033 of at least one support member 2004 between top surface 2012 and bottom surface 2014 of support structure 2010. The mean average thickness 2138, 2140, 2142 of support structure 2010 between apex 2144, 2146, 2148 of one of channels 2018, 2024 and 2026 and top surface 2012 is typically about 0.6 cm (¼ inch) to about 1.3 cm (½ inch). In an embodiment of the present invention, the mean average thickness 2138, 2140, 2142 of support structure 2010 between apex 2144, 2146, 2148 of one of channels 2018, 2024 and 2026 and top surface 2012 is about 0.6 cm (¼ inch).

The mean average thickness of 2033 of at least one support member 2004 between top surface 2012 and bottom surface 2014 of support structure 2010 typically has a range from about 1.9 cm (¾ inch) to about 6.4 cm (2½ inches). In an embodiment of the present invention, the mean average thickness 2033 of support member 2004 between top surface 2012 and bottom surface 2014 is about 1.9 cm (¾ inch).

The average cross-sectional area 2047 of a portion of a plane 2131 within support structure 2010 defined between channel 2018 and top surface 2012 of support structure 2010 at a maximum width 2037 of channel 2018 is typically less than an average cross-sectional area 2053 of a portion of a plane 2035 of at least one support member 2004 defined between top surface 2012 and bottom surface 2014 of support structure 2010 and having a width 2055 equal to the maximum channel width 2037. An average cross-sectional area 2049 of a portion of a plane 2133 within support structure 2010 defined between channel 2024 and top surface 2012 of support structure 2010 at a maximum width 2041 of channel 2024 is less than an average cross-sectional area of a portion of a plane of at least one support member 2004 defined between top surface 2012 and bottom surface 2014 of support structure 2010 and having a width equal to the maximum channel width 2041. An average cross-sectional area 2051 of a portion of the plane 2135 within support structure 2010 defined between channel 2026 and top surface 2012 of support structure 2010 at a maximum width 2043 of channel 2026 is less than an average cross-sectional area of a portion of a plane of at least one support member 2004 defined between top surface 2012 and bottom surface 2014 of support structure 2010 and having a width equal to the maximum channel width 2043. For example, the average cross-sectional area 2047, 2049 and 2051 as defined above ranges from about 0.7 cm$^2$ (0.1 in$^2$) to about 3.2 cm$^2$ (0.5 in$^2$), whereas the average cross-sectional area 2053 of the plane 2131, 2133, 2135, respectively, of the at least one supporting member 2004 defined between top surface 2012 and bottom surface 2014 of support structure 2010 and having a width 2055 equal to the maximum channel 2037 is about 2 cm$^2$ (0.3 in$^2$) to about 16.1 cm$^2$ (2.5 in$^2$). As used herein, maximum width 2037 means the maximum width of the channel measured at any point along the entire length of the channel.

The cross-sectional area 2150 of a void space 2152 defined by sides 2007, 2009 of channel 2018 and bottom surface 2014 of support structure 2010 in plane 2035, as defined above, typically ranges from about 60% to about 95%. In an embodiment of the present invention, the cross-sectional area 2150 is about 85%.

The cross-sectional area 2154 of void spaces 2156 defined by sides 2158, 2160 of channel 2024 and bottom surface 2014 of support structure 2010 in plane 2035, as defined above, typically ranges from about 60% to about 95%. In an embodiment of the present invention, the cross-sectional area 2154 is about 85%.

The cross-sectional area 2162 of void spaces 2164 defined by sides 2166, 2168 of channel 2026 and bottom surface 2014 of support structure 2010 in plane 2035, as defined above, typically ranges from about 60% to about 95%. In an embodiment of the present invention, the cross-sectional area 2162 is about 85%.

As shown in FIG. 2, the plurality of supporting members 2004 can be formed as a plurality of ribs forming a pattern of void spaces 2036 therebetween. Void space 2036 is the mean average cross-sectional area between sides 2170, 2172, 2174, 2176 of the supporting members. In some embodiments, the void spaces 2036 comprise about 60% to about 90% of the total surface area of support structure. In other embodiments, the void spaces 2036 comprise about 85% of the total surface area of support structure 2010. While a pattern of squares is illustrated in FIG. 2, this is not to be construed as limiting the present invention as a variety of other patterns may be utilized including, but not limited to, patterns of rectangles, pentagons, hexagons, octagons, triangles or circles.

Supporting members 2004 may, for example, have a mean average width 2034 typically ranging from about 1.0 cm (0.4 inch) to about 2.5 cm (1 inch). In an embodiment of the present invention, supporting member 2004 has a mean average width 2034 that is about 1.5 cm (0.6 inch).

The mean average distance 2035 between supporting members 2004 may, for example, range from about 2.0 cm (0.8 inch) to about 7.6 cm (3 inches). In an embodiment of the present invention, the mean average distance 2035 between supporting members 2004 is about 6.4 cm (2.5 inches). The configuration of supporting members 2004 may be the same or different as desired.

Channels 2018 and 2024 are formed during a molding process, discussed hereinafter, by molding the pattern of the plurality of supporting members 2004 without one supporting member extending along the central x-axis of support structure 2010 from first portion 2020 of edge 2016 to second, opposing portion 2022 of edge 2016 along the x-axis, and without at least one supporting member extending along the y-axis of support structure 2010 from third portion 2028 of edge 2016 to fourth, opposing portion 2030 of edge 2016 along the y-axis. In an alternate embodiment, channels 2018 and 2024 may be formed by manually removing one supporting member extending along the central x-axis of support structure 2010, and manually removing one supporting member along the y-axis of support structure 2010.

Channels 2018, 2024 and 2026 are formed during a molding process, discussed hereinafter, by molding the pattern of the plurality of supporting members 2004 without one supporting member extending along the central x-axis of support structure 2010 from first portion 2020 of edge 2016 to second, opposing portion 2022 of edge 2016 along the x-axis, and without two supporting members 2004 extending along the y-axis of support structure 2010 from third portion 2028 of edge 2016 to fourth, opposing portion 2030 of edge 2016 along the y-axis. In an alternate embodiment, channels 2018, 2024 and 2026 may be formed by manually removing one supporting member extending along the central x-axis of support structure 2010, and manually removing two supporting members 2004 along the y-axis of support structure 2010.

As described above, channels 2018, 2024 and 2026 are formed so as to inhibit warpage of panel 2000, and permit top surface 2004 of panel 2000 to be generally planar, i.e., less than about 5% warpage, more preferably less than about 2% warpage. The warpage of top surface 2004 can be determined pursuant to a Warpage Test performed after the manufacturing of panel 2000. As used herein the "Warpage Test" is as follows: First, a section of five to seven panels are interconnected and assembled and placed upon a floor support surface, for example a grass or concrete floor support surface. The section of panels may comprise five to seven panels. A fork lift, such as a HYSTER fork lift, weighing a minimum 2722 kg (6000 lbs.) with an 1814 kg (4000 lbs.) load is driven across the section of panels at a minimum speed of 10 mph with at least 15 sharp braking stops and at least 15 turns for a period of at least 15 minutes. Any separation, break or crack in the panels other than normal elastic deformation stretching of the material used to construct the panels is considered a failure.

Figure 9:
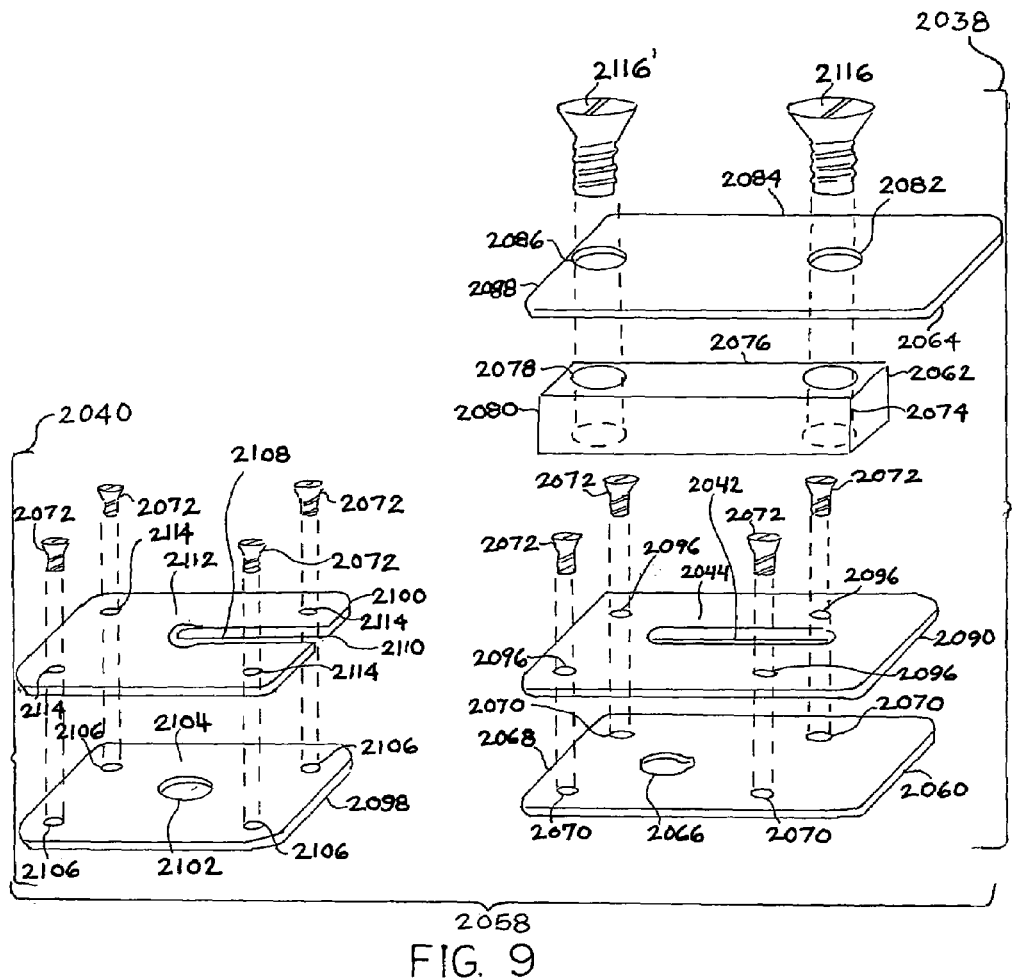
FIG. 9 is an exploded perspective view of a connecting member and a receiving member of a connecting system according to the present invention, some but not all of the components and elements of the connection system are depicted in relative alignment with each other in FIG. 9.
Figure 10:
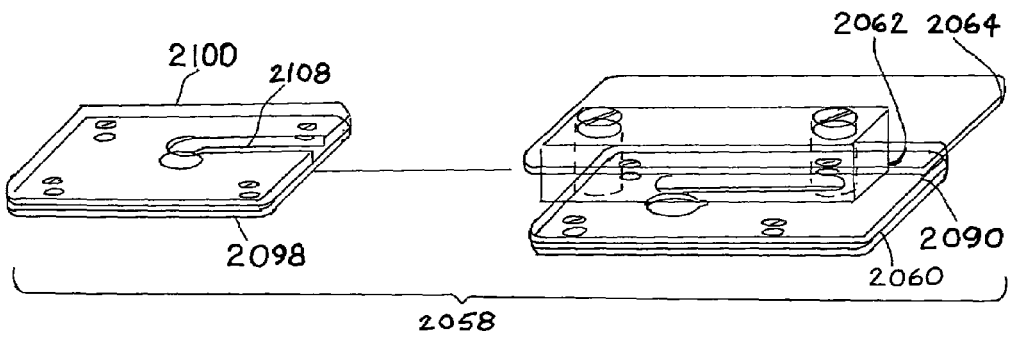
FIG. 10 is an assembled perspective view of the connecting member and the receiving member of FIG. 9.

With reference to FIGS. 5 through 8 and with continuing reference to FIGS. 1 through 4, panel 2000 can further comprise a plurality of notches 2039 positioned along body 2002 of panel 2000. The notches 2039 are adapted to receive a connection system 2058 for attaching panel 2000 to a second panel 2000'. The connection system 2058 comprises at least one connecting member 2038 and at least one receiving member 2040 (see for example FIGS. 9 and 10). Each notch 2039 is molded to correspond to either a respective connecting member 2038 or a respective receiving member 2040 and will be referred to as connecting notches 2042 and receiving notches 2044 hereinafter. Also, connecting member 2038 and receiving member 2040 will be discussed in greater detail hereinafter.

Referring to FIGS. 7A through 8B, connecting notch 2042 comprises a ledge 2046 adapted to receive and support at least a portion of connecting member 2038 thereon. Connecting notch 2042 further comprises a lip portion 2048 designed to engage a corresponding lip portion 2050 of receiving notch 2044 thereby connecting the two panels 2000 and 2000'. In some embodiments, lip portion 2050 can be angled to inhibit relative lateral movement of panels 2000 and 2000'. A plurality of holes 2052 (for example, four), adapted for receiving a fastening member, are molded into connecting notch 2042 allowing connecting member 2038 to be secured thereto. One skilled in the art will appreciate that the position, dimensions and number of holes can be varied as desired to ensure proper connection between panels 2000 and 2000'. Alternatively, holes 2052 may also be manually formed into panel 2000 by, for example, drilling. Generally, the diameter of the holes can vary as desired, for example from about 0.6 cm (¼ inch) diameter to 1.2 cm (½ inch) diameter.

Receiving notch 2044 may further comprise a ledge 2054 adapted to receive and support at least a portion of connecting member 2038 thereon, and a lip portion 2050. A plurality (for example, four) of holes 2056 may be molded into receiving notch 2044 allowing receiving member 2040 to be secured thereto. Alternatively, holes 2052 may also be manually formed into panel 2000.

With reference to FIGS. 9 through 12, a connection system 2058 comprises connecting member 2038 and receiving member 2040. Connecting member 2038 comprises a first plate 2060, a support plate 2062 and a top plate 2064. First plate 2060 has a generally planar shape with four sides and comprises a hole 2066 proximate a first end 2068 of plate 2060. First plate 2060 may further comprise a plurality of holes 2070 positioned proximate each corner of plate 2060. When used in a panel system, each hole 2070 is aligned with a hole 2052 in connecting notch 2042 of panel 2000 thereby allowing first plate 2060 to be fastened to connecting notch 2042 via a fastening member 2072. The dimensions (length, width, thickness) of the first plate 2060 can be varied as desired so long as the first plate 2060 has sufficient strength and structural integrity to securely fasten the panels together with minimal relative movement of the panels. The mean average length of first plate 2060 may, for example, range from about 12 cm (5 inches) to about 51 cm (20 inches). The mean average width of first plate 2060 may, for example, range from about 10 cm (4 inches) to about 51 cm (20 inches). The mean average thickness of first plate 2060 may, for example, range from about 0.2 cm ($\frac{1}{16}$ inch) to about 2.5 cm (1 inch). In an embodiment of the present invention, first plate 2060 has: a mean average length of 16.2 cm (6$\frac{3}{8}$ inches); a mean average width of 10.2 cm (4 inches); and a mean average thickness of 0.3 cm ($\frac{1}{8}$ inch).

Support plate 2062 is positioned generally parallel to first plate 2060 and comprises a first hole 2074 located in a central region 2076 of plate 2062 such that first hole 2074 is generally aligned with hole 2066 of first plate 2060. Support plate 2062 also comprises a second hole 2078 spaced apart from first hole 2074 proximate a first end 2080 of support plate 2062. The dimensions (length, width, thickness) of the support plate 2062 can be varied as desired so long as the support plate 2062 has sufficient strength and structural integrity to securely fasten the panels together with minimal relative movement of the panels. The mean average length of support plate 2062 may, for example, range from about 12.7 cm (5 inches) to about 51 cm (20 inches). The mean average width of support plate 2062 may, for example, range from about 5 cm (2 inches) to about 51 cm (20 inches). The mean average thickness of the support plate 2062 may, for example, range from about 0.2 cm ($\frac{1}{16}$ inch) to about 2.5 cm (1 inch). In an embodiment of the present invention, support plate 2062 has: a mean average length of 15.2 cm (6 inches); a mean average width of 5 cm (2 inches); and a mean average thickness of 1.3 cm ($\frac{1}{2}$ inch).

Top plate 2064 is positioned generally parallel to and above support plate 2062. Top plate 2064 comprises a first hole 2082 located in a central region 2084 of plate 2064 such that first hole 2082 is generally aligned with first hole 2074 of support plate 2062 and hole 2066 of first plate 2060. As used herein "generally parallel" with reference to the orientation of support plate 2062 and top plate 2064 means that the engaging faces of support plate 2062 and top plate 2064 are generally parallel. Top plate 2064 further comprises a second hole 2086 spaced apart from first hole 2082 proximate a first end 2088 of top plate 2064 and generally aligned with second hole 2078 of support plate 2062. When used in a panel system, a portion of top plate 2064 (which portion includes first hole 2082) is positioned within connecting notch 2042 (FIG. 7B) such that an upper surface of top plate 2064 is in facing engagement (substantially flush) with top surface 2006 of panel 2000. In addition, a further portion of top plate 2064 (which further portion includes second hole 2086) extends into receiving notch 2044 (FIG. 8B), so as to reside abuttingly over a portion of second plate 2100 of receiving member 2040 with second hole 2086 of top plate 2064 being aligned with a portion of slot 2108 of second plate 2100 of receiving member 2040. The upper surface of the further portion of top plate 2064 that extends into receiving notch 2044 is preferably substantially flush with the top surface of the molded panel in which receiving notch 2044 resides (e.g., panel 2000'). See, for example, FIGS. 7B, 8B, 14, 34 and 35.

The dimensions (length, width, thickness) of the top plate 2064 can be varied as desired so long as the top plate 2064 has sufficient strength and structural integrity to securely fasten the panels together with minimal relative movement of the panels. The mean average length of top plate 2064 may, for example, range from about 20 cm (8 inches) to about 51 cm (20 inches). The mean average width of top plate 2064 may, for example, range from about 10 cm (4 inches) to about 51 cm (20 inches). In addition, the mean average thickness of top plate 2064 may, for example, range from about 0.16 cm ($\frac{1}{16}$ inch) to about 2.5 cm (1 inch). In an embodiment of the present invention, top plate 2064 has: a mean average length of 25.7 cm (10$\frac{1}{8}$ inches); a mean average width of 11.4 cm (4$\frac{1}{2}$ inches); and a mean average thickness of 0.2 cm ($\frac{1}{16}$ inch).

Connecting member 2038 may optionally further include a second plate 2090 including an elongated slot 2042 positioned along a longitudinal axis of second plate 2090 in a central region 2044 thereof. Second plate 2090 may be: (i) positioned either generally planar and adjacent to first plate 2060 (see, for example, FIGS. 9 and 35); or (ii) generally planar but spaced apart from first plate 2060 such that support plate 2062 is interposed between first plate 2060 and second plate 2090 (see, for example, FIG. 34). First plate 2060 and second plate 2090 may have the same general overall planar shape as desired. Second plate 2090 may further comprise a plurality of holes 2096 positioned proximate each corner of plate 2090 that generally align with the holes 2070 of first plate 2060. Each hole 2096 also aligns with a hole 2052 in connecting notch 2042 (see, for example, FIG. 7B) thereby allowing second plate 2090 to be fastened to connecting notch 2042 via a fastening member 2072. The dimensions (length, width, thickness) of second plate 2090 can be varied as desired so long as the first plate 2060 has sufficient strength and structural integrity to securely fasten the panels together with minimal relative movement of the panels. The mean average length of second plate 2090 may, for example, range from about 12 cm (5 inches) to about 51 cm (20 inches). The mean average width of second plate 2090 may, for example, range from about 10 cm (4 inches) to about 51 cm (20 inches). The mean average thickness of second plate 2090 may, for example, range from about 0.2 cm ($\frac{1}{16}$ inch) to about 2.5 cm (1 inch). In an embodiment of the present invention, second plate 2090 has: a mean average length of 16.2 cm (6$\frac{3}{8}$ inches); a mean average width of 10.2 cm (4 inches); and a mean average thickness of 0.32 cm ($\frac{1}{8}$ inch).

The thickness of support plate 2062 of connecting member 2038 is preferably greater than the combined (or total) thickness of first plate 2060 and top plate 2064 of connecting member 2038. In a further embodiment of the present invention, support plate 2062 of connecting member 2038 has a thickness that is greater than the combined (or total) thickness of first plate 2060, top plate 2064 and second plate 2090 of connecting member 2038. Support plate 2062 may be provided with a greater thickness so as to facilitate supporting the weight of a load positioned on the panel assembly (e.g., a panel assembly including panel 2000 and panel 2000').

Receiving member 2040 comprises a first plate 2098 and a second plate 2100. First plate 2098 comprises a hole 2102 located in a central region 2104 thereof. First plate 2098 may further comprise a plurality of holes 2106 positioned in each corner of plate 2098. Each hole 2106 aligns with a hole 2056 in receiving notch 2044 (see, for example, FIGS. 5 and 8B)

thereby allowing first plate 2098 to be fastened to receiving notch 2044 via a fastening member 2072. The dimensions (length, width, thickness) of the first plate 2098 can be varied as desired so long as the first plate 2098 has sufficient strength and structural integrity to securely fasten the panels together with minimal relative movement of the panels. The mean average length of first plate 2098 may, for example, range from about 10.2 cm (4 inches) to 17.8 cm (7 inches). The mean average width of the first plate 2098 may, for example, range from about 6.4 cm (2.5 inches) to 16.5 cm (6.5 inches). The mean average thickness of the first plate 2098 may, for example, range from about 0.2 cm (1/16 inch) to 0.6 cm (1/4 inch). In an embodiment of the present invention, first plate 2098 has: a mean average length of 14 cm (5.5 inches); a mean average width of 10.2 cm (4 inches); and a mean average thickness of 0.3 cm (1/8 inch).

Second plate 2100 is positioned generally planar to but spaced apart from first plate 2098. Second plate 2100 comprises a slot 2108 extending from a first end 2110 of second plate 2100 into a central region 2112 of second plate 2100 such that at least a portion of slot 2108 in central region 2112 is generally aligned with hole 2102 in central region 2104 of first plate 2098. First plate 2098 and second plate 2100 have the same general planar shape. Second plate 2100 may further comprise a plurality of holes 2114 positioned in each corner of second plate 2100 that generally align with the holes 2106 of first plate 2098. Each smaller hole 2114 also aligns with a hole 2056 in receiving notch 2044 (see for example FIGS. 5 and 8B) thereby allowing second plate 2100 to be fastened to receiving notch 2044 via a fastening member 2072. Second plate 2100 is positioned within receiving notch 2044 such that an upper surface of second plate 2100 is in facing engagement with top surface 2006 of panel 2000. The dimensions (length, width, thickness) of the second plate 2100 can be varied as desired so long as the second plate 2100 has sufficient strength and structural integrity to securely fasten the panels together with minimal relative movement of the panels. The mean average length of the second plate 2100 may, for example, range from about 10.2 cm (4 inches) to 17.8 cm (7 inches). The mean average width of the second plate 2100 may, for example, range from about 6.4 cm (2.5 inches) to 16.5 cm (6.5 inches). The mean average thickness of second plate 2100 may, for example, range from about 0.2 cm (1/16 inch) to 0.6 cm (1/4 inch). In an embodiment of the present invention, second plate 2100 has: a mean average length of 14 cm (5.5 inches); a mean average width of 10.2 cm (4 inches); and a mean average thickness of 0.3 cm (1/8 inch).

Figure 14:
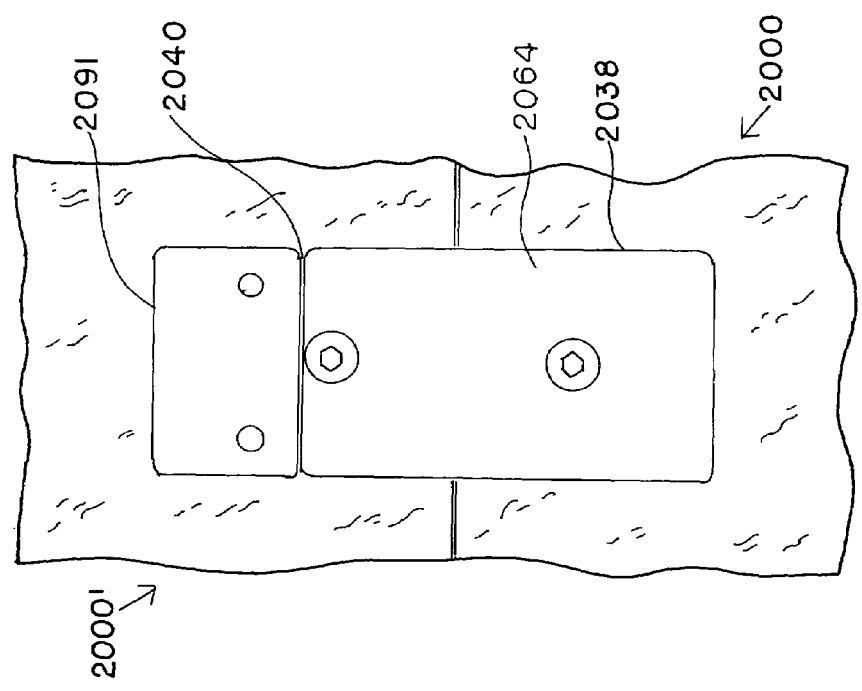
FIG. 14 is a top plan view showing a connecting member fastened to a receiving member according to the present invention.

With reference to FIG. 14, in an embodiment of the present invention, receiving member 2040 further includes a cover plate 2091. Cover plate 2091 may be used to cover at least a portion of connection system 2058 such that the upper surface of the connection system is substantially flush with the top planar surface (e.g., 2006) of panel 2000, so as to inhibit accumulation of dirt, etc. in connection system 2058 and prevent a person from tripping or piece of equipment from catching on the connections between panels 2000, 2000'. The dimensions (length, width, thickness) of the cover plate 2091 can be varied as desired so long as the cover plate 2091 has sufficient strength and structural integrity to securely fasten the panels together with minimal relative movement of the panels. The mean average length of cover plate 2091 may, for example, range from about 10.2 cm (4 inches) to 25.4 cm (10 inches). The mean average width of cover plate 2091 may, for example, range from about 6.4 cm (2.5 inches) to 16.5 cm (6.5 inches). The mean average thickness of cover plate 2091 may, for example, range from about 0.2 cm (1/16 inch) to 0.6 cm (1/4 inch). In an embodiment of the present invention, cover plate 2091 has: a mean average length of 11.4 cm (4.5 inches); a mean average width of 7 cm (2¾ inches); and a mean average thickness of 0.2 cm (1/16 inch).

The plates of connection system 2058 (e.g., plates 2060, 2062, 2064, 2090, 2091, 2098 and 2100) may be fabricated from any suitable material having sufficient rigidity to inhibit relative movement of the panels. For example plates 2060, 2062, 2064, 2090, 2091, 2098 and 2100 may each independently be fabricated from at least one metal, such as steel, aluminum and/or brass. Alternatively, plates 2060, 2062, 2064, 2090, 2091, 2098 and 2100 may each be independently fabricated from one or more reinforced polymeric materials, such as, a fiber reinforced thermoplastic and/or thermoset material, including those described further herein.

Each fastening member 2072 (see for example FIG. 9) may be selected independently from at least one of bolt and nut combinations, screws, pins (e.g., rivets) or the like, fabricated from a generally rigid material such as a metal. While connecting member 2038 and receiving member 2040 have been described hereinabove as being secured to a panel (e.g., panel 2000) via a fastening member 2072, this is not to be construed as limiting the present invention, as the scope of the present invention is inclusive of other manners of securing connecting member 2038 and receiving member 2040 to a panel, such as panel 2000. For example, connecting member 2038 and receiving member 2040 may each independently be integrally molded into a panel, such as panel 2000, during the molding process (e.g., as discussed in greater detail hereinafter).

Connecting system 2058 further comprises a connection system fastening member 2116 for connecting (e.g., fixedly or reversibly joining) connecting member 2038 and receiving member 2040 together, thereby inhibiting relative movement there-between and between the panels (e.g., panel 2000 and panel 2000') connected thereby. Connection system fastening member 2116 may be selected from bolt and nut combinations, screws, pins (e.g., rivets) or the like, and combinations thereof. In addition, the connection system fastening member may include a plurality of connection system fastening members (e.g., first connection system fastening member 2116 and second connection system fastening member 2116').

Figure 34:
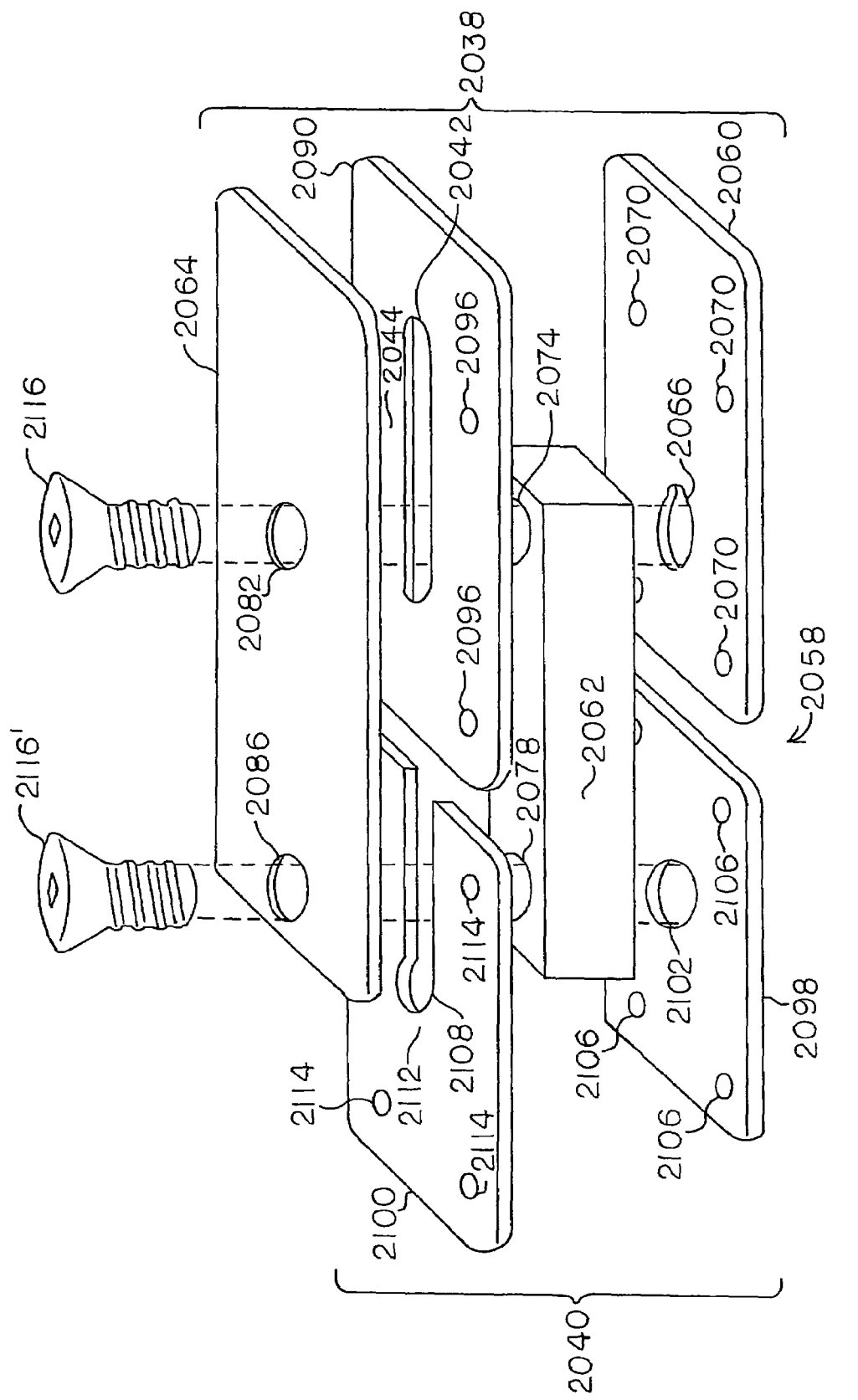
FIG. 34 is a representative exploded perspective view of an arrangement, in accordance with an embodiment of the present invention, of the plates of the connecting member and the receiving member, in which molded panels are not depicted for purposes of improved clarity and illustration.

In an embodiment of the present invention and with reference to FIG. 34, joinder of molded panels 2000 and 2000' involves a portion of support plate 2062 of connecting member 2038 extending into (equivalently being received within) receiving member 2040. In particular, a portion of support plate 2062 is positioned (e.g., interposed) between first plate 2098 and second plate 2100 of receiving member 2040 such that second hole 2078 of support plate 2062 and second hole 2086 of top plate 2064 of connecting member 2038 are aligned with hole 2102 of first plate 2098 of receiving member 2040 and a portion of slot 2108 of second plate 2100 of receiving member 2040 in central region 2112. This allows second connection system fastening member 2116' to be inserted through the sequential alignment of second hole 2086, slot 2108, hole 2078 and hole 2102, so as to inhibit relative movement of connecting member 2038 and receiving member 2040 in a plane (not shown) generally parallel to the plates.

Second connection system fastening member 2116' may be inserted sequentially through the holes and slot as recited (i.e., sequentially through hole 2086, slot 2108, hole 2078 and hole 2102). Alternatively, second connection system fastening member 2116' may be inserted through the holes and slot in reverse sequential order (i.e., in reverse sequential order through hole 2102, hole 2078, slot 2108 and hole 2086). Further alternatively, a combination of two interacting connection system fasteners may be inserted concurrently through the holes and slot as initially recited (i.e., sequentially through hole 2086, slot 2108, hole 2078 and hole 2102), and in a reverse sequence of the holes and slot (i.e., in reverse sequential order through hole 2102, hole 2078, slot 2108 and hole 2086).

Figure 36:
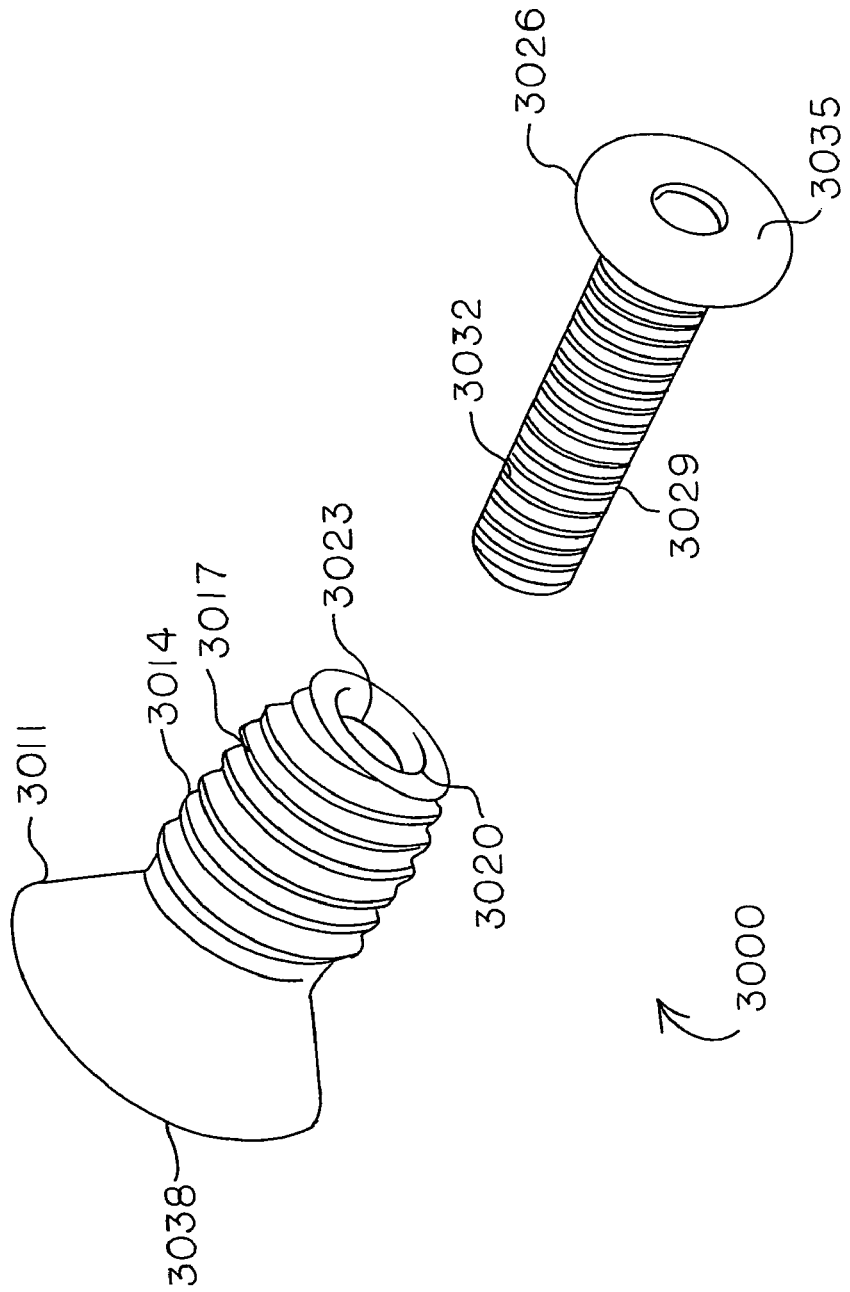
FIG. 36 is a representative exploded perspective view of a connection system fastener assembly.

With reference to FIG. 36, a connection system fastening assembly 3000 is depicted, which includes a bored fastening member 3011 having a shaft 3014 having external threads 3017 and a longitudinal bore 3020 having internal threads 3023. Longitudinal bore 3020 may extend partially or substantially completely through shaft 3014 of bored fastening member 3011. Connection system fastening assembly 3000 also includes a sized fastening member 3026 having a shaft 3029 having external threads 3032. Shaft 3029 and external threads 3032 of sized fastening member 3026 are dimensioned for threaded receipt within longitudinal bore 3020 of shaft 3014 of bored fastener 3011, such that the external threads 3032 of sized fastener 3026 threadedly engage with the internal threads 3023 of longitudinal bore 3020. In an embodiment of the present invention, bored fastener 3011 is inserted sequentially through hole 2086, slot 2108, hole 2078 and hole 2102, and sized fastener 3026 is inserted in reverse sequential order through hole 2102, hole 2078, slot 2108 and hole 2086. Shaft 3029 of sized fastener 3026 is threadedly received within threaded bore 3020 of bored fastener 3011, thereby serving to fasten connection member 2038 and receiving member 2040 together. Sized fastener 3029 may be used in conjunction with a washer (not shown) in accordance with art-recognized methods. In addition, head portion 3035 of sized fastener 3026 may be enlarged (e.g., so as to have a greater diameter, such as a diameter equal to that of head portion 3038 of bored fastener 3011).

With further reference to FIG. 34, second plate 2090 of connecting member 2038 may also optionally be present, and further optionally interposed between a portion of top plate 2064 and a portion of support plate 2062, such that first hole 2082 of top plate 2064, a portion of slot 2042 of second plate 2090, first hole 2074 of support plate 2062, and hole 2066 of first plate 2060 are sequentially aligned for receipt of first fastening member 2116 there-through. Correspondingly, a portion of support plate 2062 is interposed between second plate 2090 and first plate 2060. If connection member 2038 does not include second plate 2090, then first hole 2082 of top plate 2064, first hole 2074 of support plate 2062, and hole 2066 of first plate 2060 are sequentially aligned for receipt of first fastening member 2116 there-through. In addition, if second plate 2090 is not present, support plate 2062 is then interposed between top plate 2064 and first plate 2060. First fastening member 2116 may be passed in reverse sequence through hole 2066 of first plate 2060, first hole 2074 of support plate 2062, optionally a portion of slot 2042 of second plate 2090 and first hole 2082 of top plate 2064. Further alternatively, and as generally discussed previously herein with regard to second fastening member 2116', a combination of fastening members (e.g., connection system fastening assembly 3000) may be inserted both: sequentially through first hole 2082 of top plate 2064, optionally a portion of slot 2042 of second plate 2090, first hole 2074 of support plate 2062, and hole 2066 of first plate 2060; and in reverse sequence through hole 2066 of first plate 2060, first hole 2074 of support plate 2062, optionally a portion of slot 2042 of second plate 2090 and first hole 2082 of top plate 2064.

Figure 35:
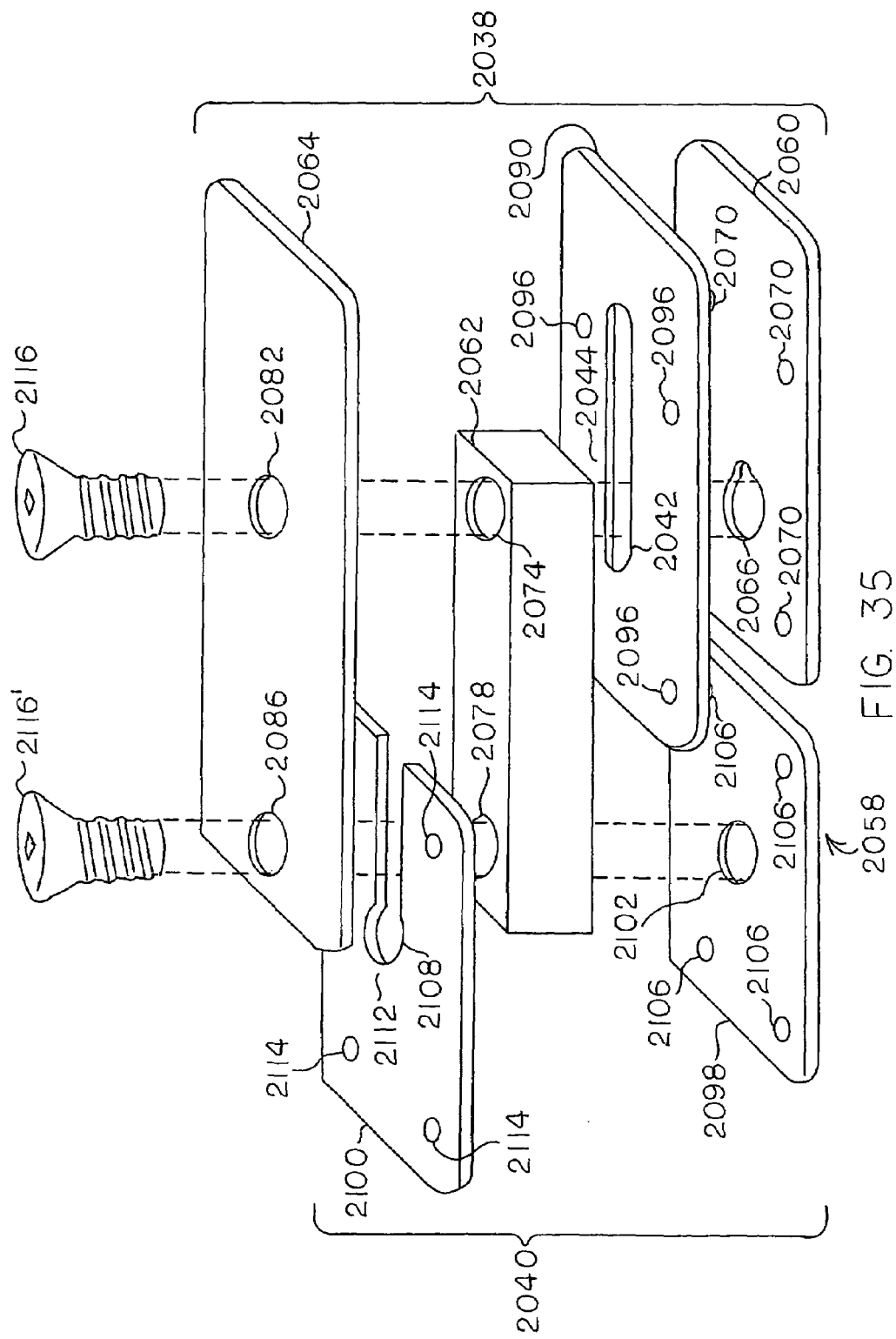
FIG. 35 is a representative exploded perspective view of an arrangement of the plates of the connecting member and the receiving member, similar to that depicted in FIG. 34 but in which the second plate of the connecting member is repositioned.

In a further embodiment of the present invention, and with reference to FIG. 35, optional second plate 2090 may be present as part of connection system 2038 and positioned generally (or substantially) planar and adjacent to first plate 2060 and being spaced form top plate 2064 of connecting member 2038, such that first hole 2082 of top plate 2064, first hole 2074 of support plate 2062, a portion of slot 2042 of second plate 2090 and hole 2066 of first plate 2060 are sequentially aligned for receipt of first fastening member 2116 there-through. As depicted in FIG. 35, second plate 2090 includes an elongated slot 2042 oriented along a longitudinal axis (not shown) in central region 2044 of second plate 2090. In this particular embodiment of the present invention, and as depicted in FIG. 35, support plate 2062 is interposed between top plate 2064 and second plate 2090 of connection member 2038. First fastening member 2116 may be passed in reverse sequence through hole 2066 of first plate 2060, optionally a portion of slot 2042 of second plate 2090, first hole 2074 of support plate 2062, and first hole 2082 of top plate 2064. Further alternatively, and as generally discussed previously herein with regard to second fastening member 2116', a combination of fastening members (e.g., connection system fastening assembly 3000) may be inserted both: sequentially through first hole 2082 of top plate 2064, first hole 2074 of support plate 2062, optionally a portion of slot 2042 of second plate 2090 and hole 2066 of first plate 2060; and in reverse sequence through hole 2066 of first plate 2060, optionally a portion of slot 2042 of second plate 2090, first hole 2074 of support plate 2062, and first hole 2082 of top plate 2064.

In FIGS. 34 and 35, molded panels 2000 and 2000' are not depicted for purposes of more clearly illustrating the relative arrangement of the plates of connecting member 2038 and the plates of receiving member 2040, and alignment of the various fasteners, holes and slots associated therewith.

Returning to FIGS. 1 and 2, connection system 2058 is illustrated as installed in panel 2000. In the Exemplary embodiment of FIGS. 1 and 2, connection system 2058 comprises four connecting members 2038 and four receiving members 2040. Connecting members 2038 and receiving members 2040 are positioned along the perimeter of panel 2000 with two connecting members 2038 positioned on along a first length, two receiving members 2040 positioned along a second length, two connecting members 2038 positioned along a first width and two receiving members 2040 positioned along a second width. While this arrangement of connection system 2058 is illustrated, this is not to be construed as limiting the present invention as a variety of arrangements of connecting members 2038 and receiving members 2040 positioned along the perimeter of panel 2000 have been envisioned.

Furthermore, a variety of other connection systems may be utilized with panel 200 without departing from the spirit and scope of the present invention. For example, a Southco® dual lock butt-joint panel fastener commercially available from Southco may be utilized to connect the panels of the present invention.

Figure 15:
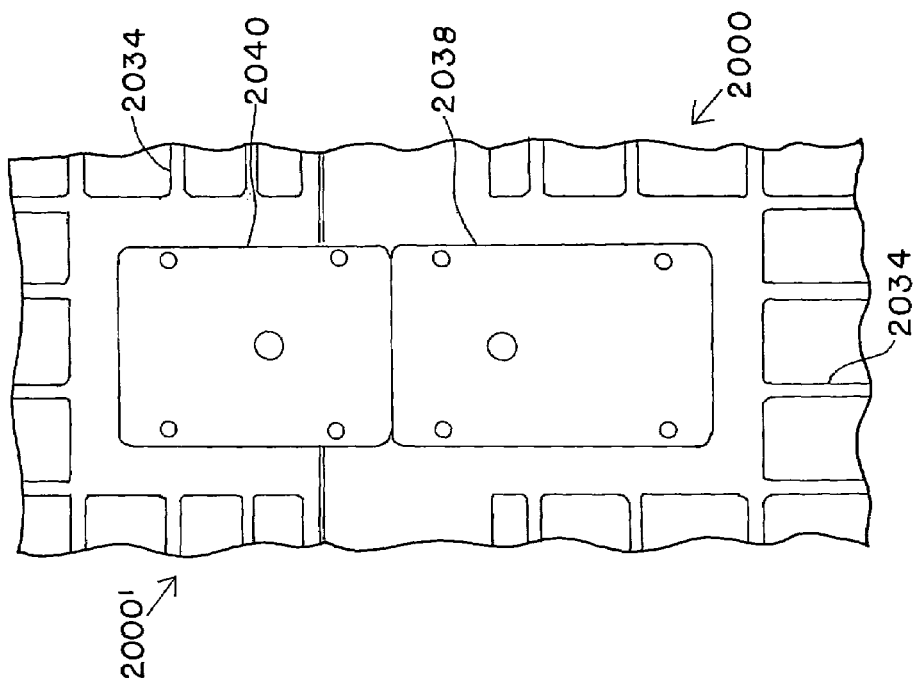
FIG. 15 is a bottom plan view of the connecting member and receiving member of FIG. 14.

With reference to FIGS. 13-15 and with continuing reference to FIGS. 1-12, the present invention is also directed to a panel system 2018. Panel system 2018 comprises at least two molded panels 2000 and 2000' and a connection system. The at least two panels 2000 and 2000' are interconnected by a connection system, such as connection system 2058. A non-limiting example of a suitable connection system 2058 comprises connecting members 2038, receiving members 2040 and fastening members as described above. Connecting members 2038 are positioned along panel 2000 so as to interact with receiving members 2040 of panel 2000'.

Figure 16:
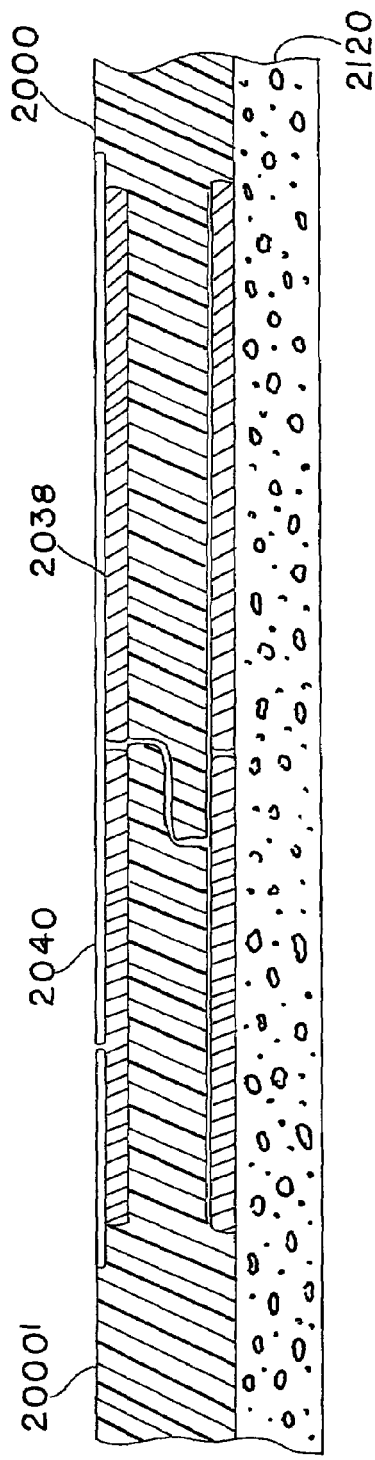
FIG. 16 is a cross-sectional view of two connected panels supported by a floor support surface according to the present invention.

With reference to FIG. 16, panel system 2058 may include one or more floor panels 2000. These floor panels can be placed upon a floor support surface 2120 such as, but not limited to, concrete, grass, ice, earth, studs, wood, combinations thereof and the like. The floor panels are placed upon and supported by floor support surface 2120. Optionally a vapor barrier or padding may be placed between the floor panels and floor support surface 2120.

Figure 17:
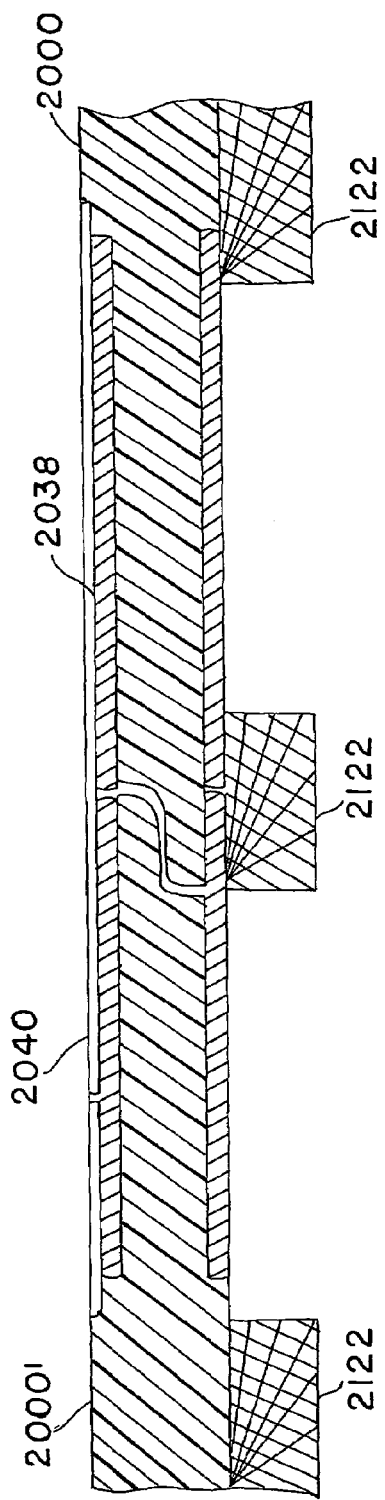
FIG. 17 is a cross-sectional view of two connected panels supported by a wall support surface according to the present invention.

With reference to FIG. 17, panel system 2058 comprises one or more wall panels 2000. These wall panels can be self-supporting or connected to a wall support surface 2122 such as, but not limited to, drywall, studs, brick, wood, combinations thereof and the like.

Panel 2000 of the present invention may be formed from any suitable material including, but not limited to thermoplastic materials and thermosettable materials. Non-limiting examples of suitable thermoplastic materials are listed in TABLE 1 below. Nonlimiting examples of useful thermosettable materials include polyesters, etc. Panel 2000 may also be formed of a composite material that is reinforced with fibers and/or other suitable fillers. Suitable reinforcement fibers are also described below. Suitable fillers include, but are not limited to clays, calcium carbonate, titanium dioxide, pigments, graphite and/or carbon black.

A process for preparing molded panel 2000 comprises the basic steps of feeding a molten thermoplastic material into a mold adapted to form the panel and applying pressure to the thermoplastic material to form the panel. This process is discussed in further detail hereinafter with reference to FIGS. 18 through 33.

With reference to FIGS. 18 and 19, a thermoforming apparatus 10 for thermoforming parts from a thermoplastic resin or from a thermoplastic composite is illustrated having an extruder 11, a mold exchange station 12, and a compression mold station 13. The extruder has a hopper 14 mounted on top for feeding a thermoplastic resin or composite material into an auger 15 where heaters are heating the thermoplastic material to a fluid material while the auger is feeding it along the length of the extruder path to an extrusion die 16 at the end thereof. The material being fed through the extruder and out the extrusion die is cut with a trimmer 17 mounted at the end of the die 16. The material is extruded in a generally flat plate slab (not shown) and is trimmed at predetermined points by the trimmer 17 as it leaves the extrusion die 16. A support platform 18 will support a traveling mold half 19 directly under the extrusion die 16 for receiving a slab of thermoplastic material. The traveling mold half 19 has wheels 20 which allow the mold half 19 to be moved from the platform 18 onto a rotating platform 21 (shown as mold half 19') which is mounted on a central rotating shaft 22 for rotation as indicated by the bidirectional arrow 21' in FIG. 18. The rotating platform 21 will have a second mold half 23 thereon which can be fed into the compression molding station 13 (shown as mold half 23') while the mold half 19 is on the platform 18. The mold half 23' can be supported on a stationary platform 24 in the compression station directly beneath a common posing fixed mold half 25 mounted to a moving platen 26 where the molding operation takes place. Thus, the mold halves 19 and 23 can shuttle back and forth so that one mold can be capturing a thermoplastic slab while the other mold half is molding a part. Each of the traveling mold halves 19, 23 has an electric motor 27 for driving the mold half from the rotating platform 21 onto the platform 18 or onto the stationary platform 24. A linear transducer 28 can be mounted on the platform 18 for controlling the traveling mold halves speed.

It should be noted at this point that the extruder 11 produces the heated extruded slab still containing the heat energy onto the traveling mold half where it is delivered to the compression mold 13 and molded into a part without having to reheat a sheet of thermoplastic material. The thermoplastic slab can also be of variable thickness throughout its width to enhance the thermoformed part made from the mold.

Figure 20A:
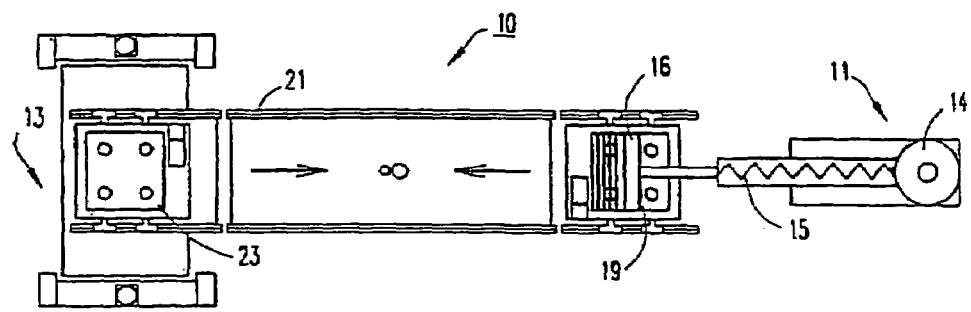
FIGS. 20A-20E are plan views of the mold of the molding system of FIGS. 18 and 19 in different steps of the process of molding a panel in accordance with the present invention.
Figure 20B:
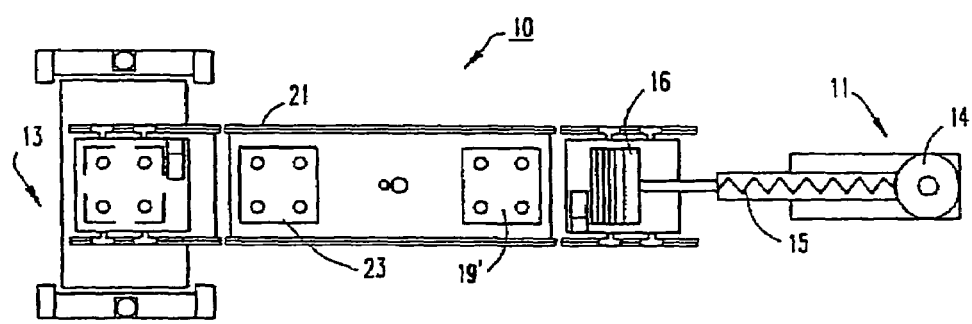
Figure 20C:
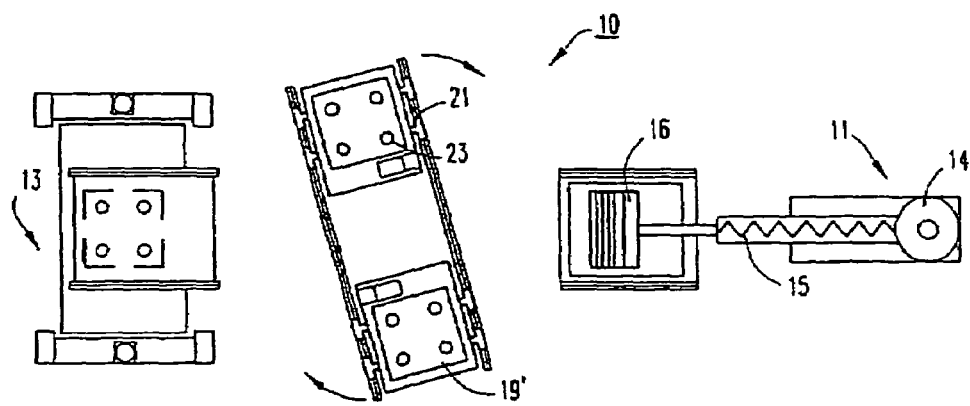
Figure 20D:
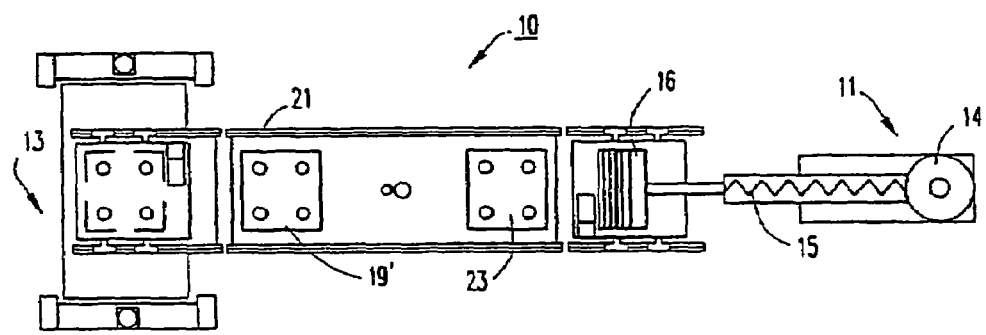
Figure 20E:
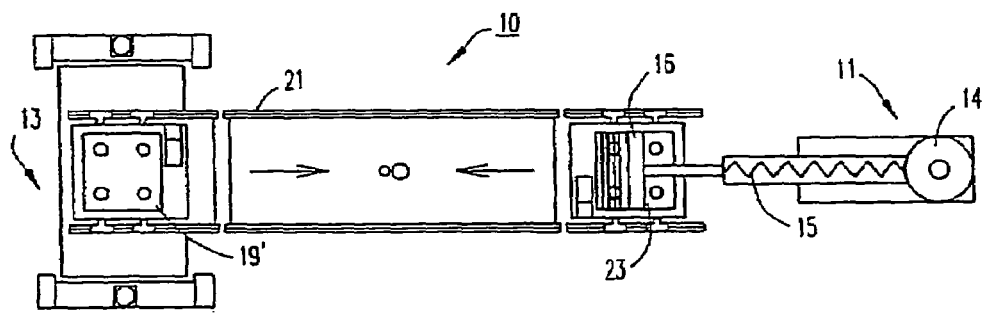

With reference to FIGS. 20A through 20E and with continuing reference to FIGS. 18 and 19, the thermoplastic molding apparatus 10 is illustrated having the mold halves 19, 19' and 23, 23' in a series of positions in the operation of the press in accordance with the present invention. Each figure has the extruder 11 having the hopper 14 feeding the thermoplastic resin or composite material into an auger 16 where it is heated before being extruded. In FIG. 20A, mold half 23' is empty and mold half 19 is being charged with a hot melt directly from the extruder 11. In FIG. 20B, the mold carrier moves the mold halves 19 and 23' on the rotating turntable 21. In FIG. 20C, the rotating turntable 21 rotates on the central axis shaft 22 (not shown) between stations for loading a slab onto one mold half 23 and a loaded mold half 19' into the compression or vacuum molding machine 13. In FIG. 20D, the mold half 19' travels into the press 13 while the empty mold half 23 travels under the extrusion die 16 for loading with a slab of thermoplastic material. In FIG. 20E, the mold half 19' is press cooled and the part is ejected while mold half 23 is charged with a hot melt as it is moved by its carrier below the extrusion die 16 until completely charged.

Figure 21:
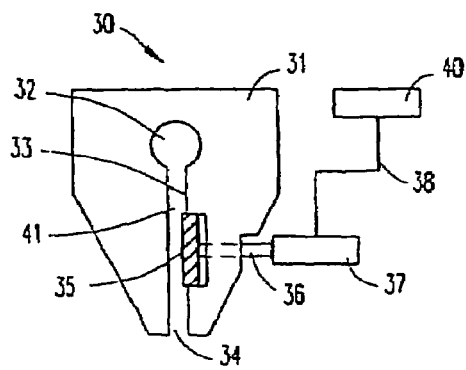
FIG. 21 is a side elevation of an extruder of the molding system of FIGS. 18 and 19.
Figure 22:
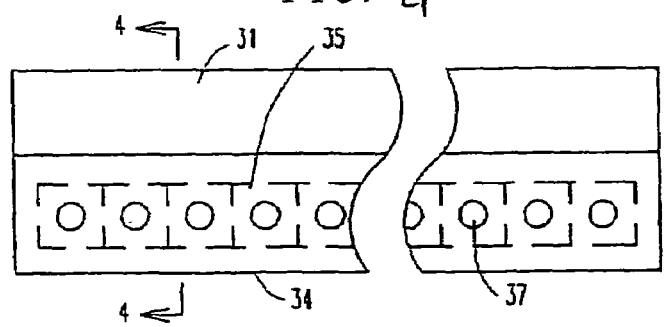
FIG. 22 is a rear elevation of the extruder of FIG. 21.

Turning to FIGS. 21 and 22, the extrusion die 30 is illustrated having the die body 31 having the channel 32 for the feeding of a fluid thermoplastic material with the auger 15 of FIGS. 18 and 19 therethrough out the extrusion channel 33 to produce a sheet or slab of thermoplastic extruded material from the mouth 34. The die 30 has a plurality of gated plates 35 each connected to a threaded shaft 36 driven by a gate actuator motor 37 which can be a hydraulic or pneumatic motor but, as illustrated, is an electrical stepper motor having a control line 38 feeding to a remote controller 40 which can step the motor 37 in steps to move the plate 35 in and out to vary the thickness of the thermoplastic slab passing the channel portion 41. A plurality of any number of motors 37 can be seen in FIG. 22 driving a plurality of plates, each mounted abutting the next plate, and each plate controlled separately to thereby vary the plates 35 in the channel 41 in a wide variety of patters for producing a slab out the output portion 34 having thickness which can vary across the width of the extruded slab. It will also be clear that the gates 35 can be manually controlled by individually threading each gate into and out to adjust the thickness of any portion of the extrusion die and can, alternatively, be controlled by a controller 40 which can be a computer program to vary the thickness of any portion of the extruded slab under remote control as desired.

A thermoplastic molding process is provided which comprises selecting a thermoplastic extrusion die 16 or 30 for the extrusion of a thermoplastic slab, which extrusion die has an adjustable die gate members for varying the thickness of the extruded material in different parts of the extruded slab. The process comprises adjusting the thermoplastic extrusion die for various thickness of the extruded material passing therethrough in different parts of the extruded slab and then heating a thermoplastic material (e.g., a thermoplastic feed material optionally including a reinforcing material, such as glass fiber) to a fluid and extruding a slab of fluid thermoplastic material through the selected and adjusted thermoplastic extrusion die. The thermoplastic slab is then optionally trimmed and directed onto a heated thermoplastic material into a thermoforming mold 19 or 23 and molded in a molding apparatus 13 to form a part with a variable thickness in the part.

It should be clear at this time that a thermoplastic molding process and apparatus have been provided which allow for the thermoforming of a part with a variable thickness with an extrusion die which can be continuously controlled to vary the thickness of different parts of the extruded slab being molded and that the molding is accomplished while the thermoplastic slab is still heated to utilize the heat energy from the extrusion process. However, it should also be clear that the present invention is not to be considered limited to the forms shown which are to be considered illustrative rather than restrictive. For example, although the extruded material is described sometimes as a generally flat plate slab, it is also described as follows: (i) containing heat energy when delivered to the compression mold 13 to obviate rehashing, (ii) having a variable thickness throughout its width, (iii) being a hot melt when charged into the mold half 19 from the extruder 11, (iv) using a plurality of gated plates 35 to vary the thickness across the width of the extruded material and in different parts of the extruded material, and finally (v) extruding molten thermoplastic material through the selected and adjusted extrusion die to achieve a variable thickness in the part formed. Thus, the extruder generally provides a molten flow of thermoplastic composite material through the dynamic die, gravitating onto a mold half or lower mold in variable quantities in the vertical plane and across both horizontal directions on the mold.

The "extrusion-molding" process described above is ideal for manufacturing medium to large thermoplastic composite structures reinforced with glass, carbon, metal or organic fibers to name a few. The extrusion-molding process comprises a computer-controlled extrusion system that integrates and automates material blending or compounding of the matrix and reinforcement components to dispense a profiled quantity of molten composite material that gravitates into the lower half of a matched-mold, the movement of which is controlled while receiving the material, and a compression molding station for receiving the lower half of the mold for pressing the upper half of the mold against the lower half to form the desired structure or part. The lower half of the matched-mold discretely moves in space and time at varying speeds to enable the deposit of material more thickly at slow speed and more thinly at faster speeds. The thermoplastic apparatus 10 described above is one embodiment for practicing the extrusion-molding process. Unprocessed resin (which may be any form of regrind or pleated thermoplastic or, optionally, a thermoset epoxy) is the matrix component fed into a feeder or hopper of the extruder, along with reinforcement fibers greater than about one-half inch (½") in length. The composite material may be blended and/or compounded by the extruder 11, and "intelligently" deposited onto the lower mold half 19 by controlling the output of the extruder 11 with the gates 35 and the movement of the lower mold half 19 relative to the position of the extruder 11, as will be described below with the embodiments shown in FIGS. 23 and 24. In those embodiments, the lower section of the matched-mold is fastened on a trolley which moves discretely below the dynamic die. The lower section of the matched-mold receives precise amounts of extruded composite material, and is then moved into the compression molding station.

The thermoplastic matrix materials that may be utilized in the extrusion-molding processes to form the composite material comprise thermoplastic resins as understood in the art. The thermoplastic resins that may be utilized in accordance with the principles of the present invention may comprise any thermoplastic resin that can be melted and blended by the extruder 11. Examples of such thermoplastic resins are provided in TABLE 1 with the understanding that the examples are not intended to be a complete list, and that other thermoplastic resins and materials may be utilized in producing the structural parts utilizing the extrusion-molding system. Additionally the thermoplastic resins of TABLE 1 may be used alone or in any combinations thereof.

TABLE 1

| THERMOPLASTIC RESINS | |
|---|---|
| polyethylene | polysulfone |
| polypropylene | polyphenylene oxide |
| polyvinyl chloride | polybutylene terephthalate |
| polyvinylidene chloride | polyethylene terephthalate |
| polystyrene | polycyclohexane diethylene terephthalate |
| styrene-butadiene-acrylonitrile copolymer | polybutylene naphthalate |
| nylon 11 | other polyesters used as soft segments |
| nylon 12 | thermotropic liquid crystal polymers |
| nylon 6 | polyphenylene sulfide |
| nylon 66 | polyether ether ketones |
| other aliphatic nylons | polyether sulfones |
| copolymers of aliphatic nylons further copolymerized with terephthalic acid or other aromatic dicarboxylic acids or aromatic diamines | polyether imides |
| other aromatic polyamides | polyamide imides |
| various copolymerized polyamides | polyimides |
| polycarbonate | polyurethane |
| polyacetal | polyether amides |
| polymethylmethacrylate | polyester amides |

Particular thermoplastic materials, including polypropylene, polyethylene, polyetheretherketone, polyesters, polystyrene, polycarbonate, polyvinylchloride, polyamides, polymethyl, polymethacrylate, acrylic, polyurethane and mixtures thereof, have been especially suitable for the extrusion-molding process. Non-limiting examples of a suitable polypropylene copolymer useful in the present invention is ExxonMobil PP7033N ethylene/propylene copolymer which is available from ExxonMobil and Phillips Sumika ATTN-080 polypropylene copolymer which is available from Phillips Sumika Polypropylene Company.

In some embodiments, the molding composition can further comprise one or more additives, such as flame retardants, colorants, mildewcides, etc.

In some embodiments, the panels can be reinforced with a reinforcement component such as those materials that may be utilized to reinforce thermoplastic resins. Fiber materials suitable for use in accordance with the principles of the present invention comprise, without limitation, glass, carbon, metal, aramid and natural materials (e.g., flax, cotton), either alone or in combination. Other fibers not listed may also be utilized as understood in the art. Although the diameter of the fiber generally is not limited, the fiber diameter for molding larger structural parts generally ranges between 1 and 20 µm. It should be understood, however, that the diameter of the fibers may be larger depending on a number of factors, including strength of structural part desired, density of fiber desired, size of structural part, etc. In particular, the effect of improvement of mechanical properties is marked with a fiber having a diameter of about one (1) to about nine (9) µm.

The number of filaments bundled in the fiber also is not generally limited. However, a fiber bundle of 10,000 to 20,000 filaments or monofilaments is generally desired for handling considerations. Rovings of these reinforcing fibers may be used after surface treatment by a silane or other coupling agent. To improve the interfacial bonding with the thermoplastic resin, for example, in the case of a polyester resin, surface treatment may be performed by a thermoplastic film forming polymer, coupling agent, fiber lubricant, etc. Such surface treatment may be performed in advance of the use of the treated reinforcing fibers or the surface treatment may be performed just before the reinforcing fibers are fed into the extruder in order to run the extrusion process to produce the molten thermoplastic composite without interruption. The ratio between the thermoplastic resin and fiber is not particularly limited as it is possible to produce the thermoplastic composite and shaped articles using any ratio of composition in accordance with the final object of use. However, to provide sufficient structural support for the structural parts, as understood in the art, the content of fibers is generally five percent (5%) to fifty percent (50%) by weight. It has been determined that the content of fibers is generally ten (10) to seventy (70) percent by weight, and preferably forty percent (40%) by weight to achieve the desired mechanical properties for the production of larger articles. In some embodiments, a fiber mat reinforcement can be used.

The average fiber length of the fibers is greater than about one-half inch (½"). However, typical structural parts produced by the extrusion-molding system 600a utilize fiber lengths longer than about one inch. It should be noted that when the average fiber length is less than one inch, the desired mechanical properties for large articles is difficult to obtain. Distribution of the fibers in the thermoplastic composite material is generally uniform so that the fibers and thermoplastic resin do not separate when melted and compressed. The distribution or disbursement of the fibers comprises a process by which the fibers are dispersed from a single filament level to a level of multiple filaments (i.e., bundles of several tens of fibers). In one embodiment, bundles of about five fibers are dispersed to provide efficiency and structural performance. Further, the "degree of combing" may be evaluated by observing a section of the structure by a microscope and determining the ratio of the number of reinforcing fibers in bundles of ten or more in all of 1000 or more observable reinforcing fibers (total number of reinforcing fibers in bundles of 10 or more/total number of reinforcing fibers times 100) (percent). Typical values produced by the principles of the present invention result in not more than about sixty percent (60%), and generally below thirty-five percent (35%).

Figure 23:
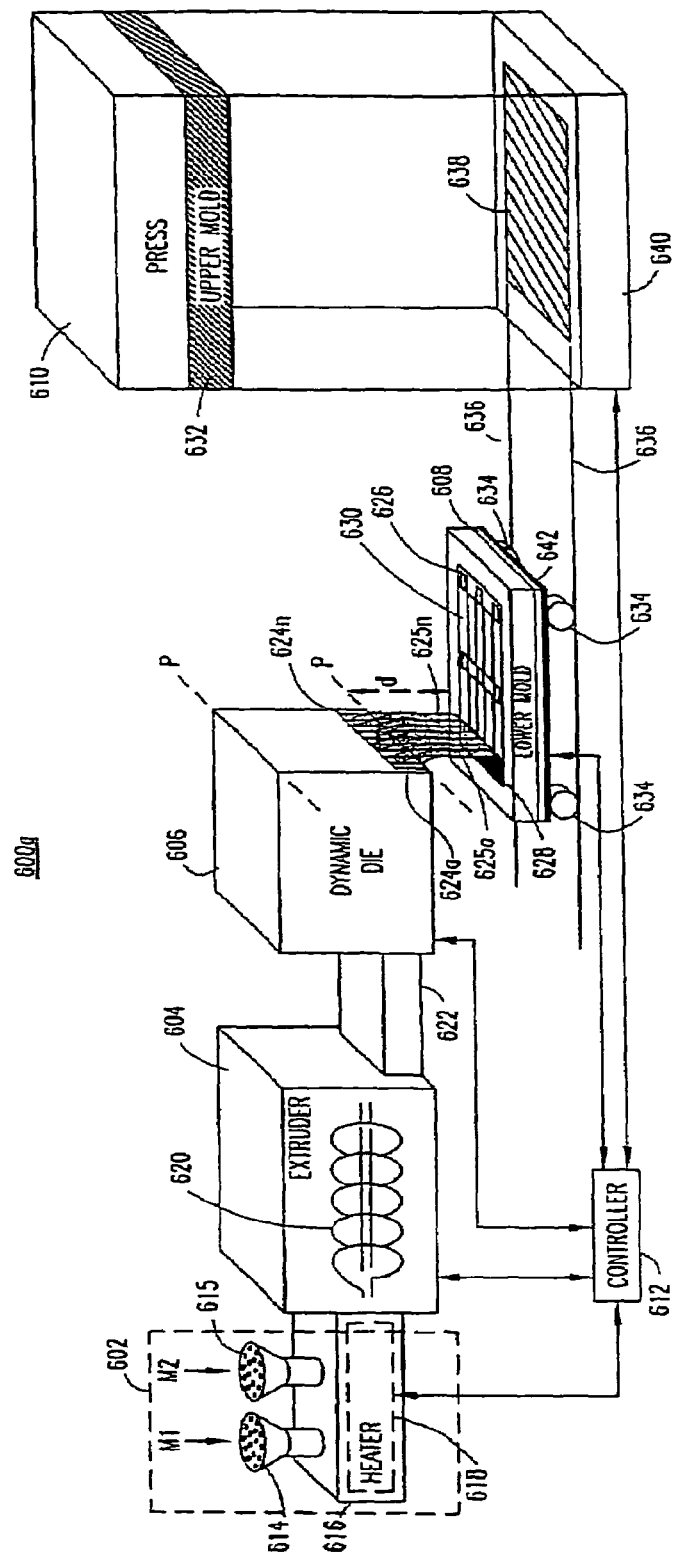
FIG. 23 is an exemplary schematic diagram of an extrusion-molding system operable to form a molded panel in accordance with the present invention.

FIG. 23 is an exemplary schematic diagram of an extrusion-molding system 600a operable to form structural parts. The extrusion-molding system 600a is composed of a number of discrete components that are integrated to form structural parts from composite material. The components comprise a material receiving unit 602, a heater 618, an extruder 604, a dynamic die 606, a trolley 608, a compression press 610, and a controller 612. Other supplemental components may also be included to form the extrusion-molding system 600a.

The material receiving unit 602 may comprise one or more hoppers or feeders 614 and 615 for receiving materials M1 and M2, respectively, that will be extruded to form a thermoplastic composite. It should be understood that additional feeders may be utilized to receive additional materials or additives to formulate different compounds. In the instant example, materials M1 and M2 represent the starting material i.e., reinforced thermoplastic materials preferably in the form of pellets. M1 and M2 may be the same or different reinforced thermoplastic material. The thermoplastic materials may be reinforced by fibers, such as glass or carbon fibers, as understood in the art. It should be further understood that non-thermoplastic material may be utilized in accordance with the principles of the present invention.

A heater 618 preheats the thermoplastic materials M1 and M2. The extruder 604 is coupled to the feeder channel 616 and operable to mix the heated thermoplastic materials M1 and M2 via an auger 620. The extruder 604 further melts the thermoplastic materials. The auger 620 may be helical or any other shape operable to mix and flow the composite material through the extruder 604. An extruder output channel 622 is coupled to the extruder 604 and is utilized to carry the composite material to a dynamic die 606.

The dynamic die 606 comprises multiple flow control elements 624a-624n (collectively 624). The flow control elements 624 may be individual gates, valves, or other mechanisms that operate to control the extruded composite material 625 from the dynamic die 606, where the extruded composite material 625a-625n (collectively 625) varies in volumetric flow rates across a plane P at or below the flow control elements 624. The outputting of the different volumetric flow rates ranges between about zero and 3000 pounds per hour. A more preferable range for the volumetric flow rate ranges between about 2500 and 3000 pounds per hour. In one embodiment, the flow control elements 624 are gates that are raised and lowered by separate actuators, such as electrical motors, (e.g., stepper motors), hydraulic actuators, pneumatic actuators, or other actuator operable to alter flow of the composite material from the adjustable flow control elements 624, individually or collectively. The flow control elements 624 may be adjacently configured to provide for a continuous separating adjacent flow control elements 624. Alternatively, the flow control elements 624 may be configured separately such that the composite material flowing from adjacent flow control elements 624 remains separated until the composite material spreads on a mold. It should be understood that the flow control elements 624 suitably may operate as a trimmer 17. In an embodiment of the invention, the molten composite material may be delivered to an accumulator, placed between the extruder 604 and the dynamic die 606, from which the composite material may be delivered into a lower mold using a plunger or other actuating mechanism.

The trolley 608 may be moved beneath the dynamic die 606 so that the extruded composite material 625 gravitates to or is deposited on a lower mold 626, which passes below the dynamic die 606 at a predetermined vertical distance, the "drop distance" (d). The lower mold 626 defines cavities 630 that are used to form a structural part. The extruded composite material 625 is deposited 628 on the lower mold 626 to fill the volume defined by the cavities 630 in the lower mold 626 and an upper mold 632 to form the composite part. In a two-axis controlled process, the composite material 625a may be deposited on the lower mold 626 at a substantially constant volumetric flow rate from the dynamic die 606 or across a vertical plane (P), based on discrete movement and variable speeds, to form the composite material layer 628 having substantially the same thickness or volume along the vertical plane (P) to fill the cavities 630 in the lower and upper molds 626 and 632. In a three-axis controlled process, the composite material may be deposited on the lower mold 626 at different volumetric flow rates from the dynamic die 606 across the vertical plane (P) to form the composite material layer 628 having different thickness or volume along the vertical plane (P) to fill the cavities 630 in the lower and upper molds 626 and 632. It should be understood that the two-axis controlled process may be utilized to deposit the composite material to molds that have cavities 630 substantially constant in depth in the vertical plane and that the three-axis controlled process may be utilized to deposit the composite to molds that have cavities 630 that vary in depth.

The trolley 608 may further comprise wheels 634 that provide for translation along a rail 636. The rail 636 enables the trolley 608 to roll beneath the dynamic die 606 and into the press 610. The press 610 operates to press the upper mold 632 into the lower mold 626. Even though the principles of the present invention provide for reduced force for the molding process than conventional thermoplastic molding processes due to the composite material layer 628 being directly deposited from the dynamic die 606 to the lower mold 626, the force applied by the press 610 is still sufficient to damage the wheels 634 if left in contact with the rail 636. Therefore, the wheels 634 may be selectively engaged and disengaged with an upper surface 638 of a base 640 of the press 610. In an embodiment, the trolley 608 is raised by inflatable tubes (not shown) coupled thereto so that when the tubes are inflated, the wheels 634 engage the rails 636 so that the trolley 608 is movable from under the die 606 to the press 610. When the tubes are deflated, the wheels 634 are disengaged so that the body of the trolley 608 is seated on the upper surface 638 of a base 640 of the press 610. It should be understood that other actuated structural components may be utilized to engage and disengage the wheels 634 from supporting the trolley 608, but that the functionality to engage and disengage the wheels 634 is to be substantially the same. For example, the upper surface 638 of the base 640 of the press 610 may be raised to contact the base plate 642 of the trolley 608.

The controller 612 is electrically coupled to the various components that form the extrusion-molding system 600. The controller 612 is a processor-based unit that operates to orchestrate the forming of the structural parts. In part, the controller 612 operates to control the composite material being deposited on the lower mold 626 by controlling temperature of the composite material, volumetric flow rate of the extruded composite material 625, and the positioning and rate of movement of the lower mold 626 via the trolley 608 to receive the extruded composite material 625. The controller 612 is further operable to control the heater 618 to heat the thermoplastic materials. The controller 612 may control the rate of the auger 620 to maintain a substantially constant flow of composite material through the extruder 604 and into the dynamic die 606. Alternatively, the controller 612 may alter the rate of the auger 620 to alter the volumetric flow rate of the composite material from the extruder 604. The controller may further control heaters (not shown) in the extruder 604 and the dynamic die 606. Based on the structural part being formed, a predetermined set of parameters may be established for the dynamic die 606 to apply the extruded composite material 625 to the lower mold 626. The parameters may be defined such that the flow control elements 624 may be selectively positioned such that the movement of the trolley 608 is positionally synchronized with the volumetric flow rate of the composite material in accordance with the cavities 630 that the define the structural part being produced.

The trolley 608 may further comprise a heater (not shown) that is controlled by the controller 612 and is operable to maintain the extruded composite material 625 in a heated or melted state. The controller may, by varying the required speeds of the trolley, control the trolley 608 during extruded composite material 625 being applied to the lower mold 626. Upon completion of the extruded composite material 625 being applied to the lower mold 626, the controller 612 drives the trolley 608 into the press 610. The controller then signals a mechanism (not shown) to disengage the wheels 634 from the track 636 as described above so that the press 610 can force the upper mold 632 against the lower mold 626 without damaging the wheels 634.

Figure 24:
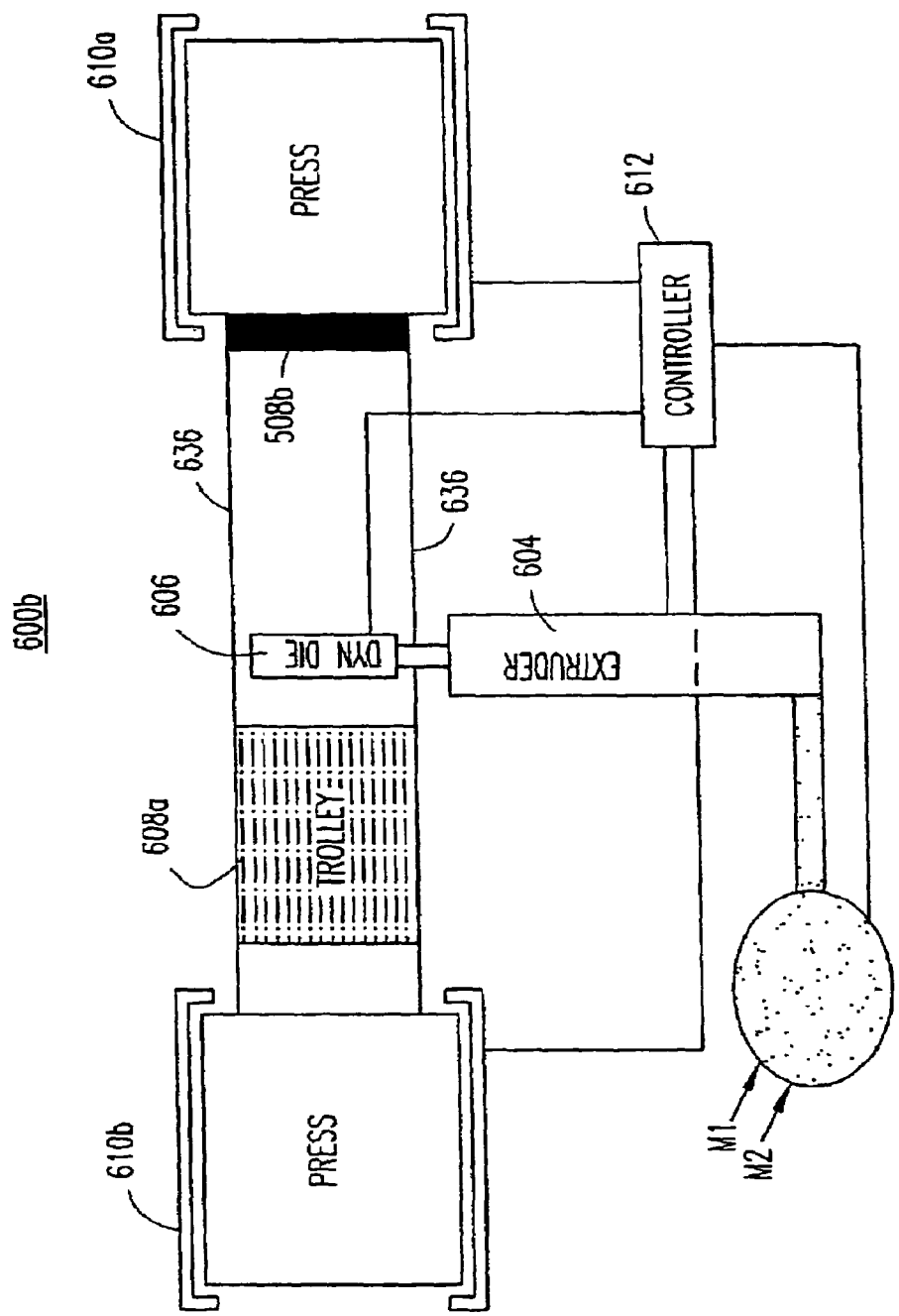
FIG. 24 is another exemplary block diagram of the extrusion-molding system of FIG. 23.

FIG. 24 is another exemplary block diagram of the extrusion-molding system 600a of FIG. 23. The extrusion-molding system 600b is configured to support two presses 610a and 610b that are operable to receive the trolley 608 that supports the lower mold 626 to form the structural part. It should be understood that two trolleys 608 may be supported by the tracks or rails 636 so as to provide for forming multiple structural components by a single extruder 604 and dynamic die 606. While wheels 634 and rails 636 may be utilized to provide movement for the trolley 608 in one embodiment, it should be understood that other movement mechanisms may be utilized to control movement for the trolley 608. For example, a conveyer, suspension, or track drive system may be utilized to control movement for the trolley 608.

The controller 612 may be configured to support multiple structural parts so that the extrusion-molding system 600b may simultaneously form the different structural parts via the different presses 610a and 610b. Because the controller 612 is capable of storing parameters operable to form multiple structural parts, the controller 612 may simply alter control of the dynamic die 606 and trolleys 608a and 608b by utilizing the parameters in a general software program, thereby providing for the formation of two different structural parts using a single extruder 604 and dynamic die 606. It should be understood that additional presses 610 and trolleys 608 may be utilized to substantially simultaneously produce more structural parts via a single extruder 604 and dynamic die 606.

Figure 25:
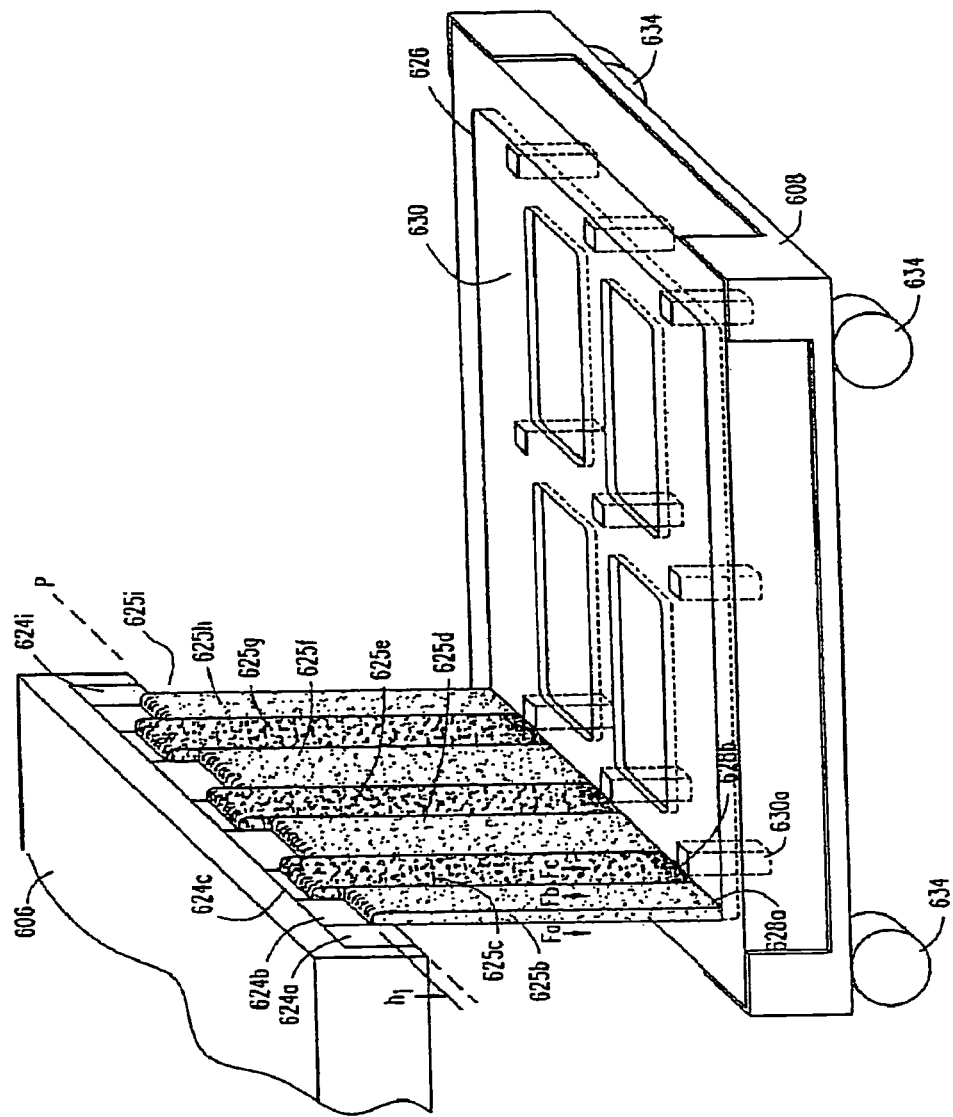
FIG. 25 is an exemplary exploded view of a dynamic die of the extrusion-molding system of FIG. 23 depositing extruded thermoplastic material on a lower mold as supported by a trolley.

FIG. 25 is an exemplary exploded view of the dynamic die 606 depositing the extruded composite material 625 on the lower mold 626 as supported by the trolley 608. As shown, the dynamic die 606 comprises the multiple flow control elements 624a-624i. It should be understood that the number of flow control elements 624 may be increased or decreased depending upon the resolution or detail of the structural part being formed. As shown, the flow control elements 624 are positioned at different heights so as to provide more or less volumetric flow rate of the extruded composite material 625 associated with each flow control element 624. For example, flow control element 624a is completely closed, so as to prevent composite material from being passed through that section of the dynamic die 606. The volumetric flow rate $f_a$ is therefore zero associated with the closed flow control element 624a. The flow control element 624b is opened to form an aperture having a height $h_1$, thereby providing a volumetric flow rate $f_b$ of the extruded composite material 625b. Similarly, the flow control element 624c is opened to form a larger aperture for the extruded composite material 625c to be output at a higher volumetric flow rate $f_c$ onto the lower mold 626.

As indicated by the variation in shading of the extruded composite material 625 associated with each of the flow control elements 624, the flow control elements 624 may be dynamically adjusted based on the structural part being formed via the lower and upper molds 626 and 632. Accordingly, based on the structural part being formed (e.g., deep draw over a certain region), the flow control elements 624 may be adjusted to alter the volumetric flow rates of the extruded composite material 625 over finite regions of the lower and upper molds 626. In other words, based on the cavities 630 defined by the lower and upper molds 626 and 632, the composite material layer 628 may be varied in thickness. For example, the composite material layer region 628a is thinner than composite material layer region 628b, which is thicker to sufficiently fill the cavity 630a, which has a deeper draft than other locations of the cavity 630 in the lower mold 626. In other words, the extruded composite material layer 628 is dynamically altered based on the depth of the cavity 630 defined by the molds 626 and 632. In both the two- and three-axis controlled processes capable of being performed on the extrusion-molding system 600a, the extruded composite material layer 628 may be dynamically altered in terms of thickness based on the volumetric flow rate of the extruded composite material 625 and the speed of travel of the trolley 608.

Depositing the extruded composite material onto the lower mold may be performed by controlling the amount of extruded composite material deposited in two or three axes depending on the structural part being produced. For the two-axis control, the movement of the trolley may be controlled along the axis of movement to deposit the extruded composite material in various amounts along the axis of deposit. For the three-axis control, the output of the extruder may utilize a dynamic die that comprises flow control elements, thereby providing for different volumetric flow rates to be simultaneously deposited onto the lower mold along the axis perpendicular to the axis of movement. It should be understood that other embodiments may provide for off-axis or non-axis control to deposit the extruded composite material in specific locations on the lower mold.

By providing for control of the trolley and composite material being applied to the lower mold, any pattern may be formed on the lower mold, from a thick continuous layer to a thin outline of a circle or ellipse, any two-dimensional shape that can be described by discrete mathematics can be traced with material. Additionally, because control of the volume of composite material deposited on a given area exists, three-dimensional patterns may be created to provide for structural components with deep draft and/or hidden ribs, for example, to be produced. Once the structural part is cooled, ejectors may be used to push the consolidated material off of the mold. The principles of the present invention may be designed so that two or more unique parts may be produced simultaneously, thereby maximizing production efficiency by using a virtually continuous stream of composite material.

Value-Added Benefits of the Extrusion-Molding Process

With the extrusion-molding system, large long-fiber reinforced plastic parts may be produced in-line and at very low processing costs. Features of the extrusion system provide for a reinforced plastic components production line that offers (i) materials flexibility, (ii) deposition process, (iii) low-pressures, and (iv) machine efficiency. Materials flexibility provides for savings in both material and machine costs from in-line compounding, and further provides for material property flexibility. The deposition process adds value in the material deposition process, which allows for more complicated shapes (e.g., large draft and ribs), better material flow, and ease of inclusion of large inserts in the mold. The low-pressures is directed to reduced molding pressures, which lessen the wear on both the molds and the machines, and locks very little stress into the structural parts. The machine efficiency provides for the ability to use two or more completely different molds at once to improve the efficiency of the extrusion system, thereby reducing the required number of machines to run a production operation. Additionally, the material delivery system according to the principles of the present invention may be integrated with many existing machines.

Materials Flexibility

The extrusion-molding process allows custom composite blends to be compounded using several different types of resin and fiber. The extrusion system may produce parts with several resins as described above. With traditional compression molding, pre-manufactured thermoplastic sheets, commonly known as blanks that combine a resin with fibers and desired additives are purchased from a thermoplastic sheet producer. These blanks, however, are costly because they have passed through several middle-men and are usually only sold in pre-determined mixtures. By utilizing the extrusion-molding process according to the principles of the present invention, these costs may be reduced by the in-line compounding process utilizing the raw materials to produce the structural parts without having to purchase the pre-manufactured sheets. Labor and machine costs are also dramatically reduced because the extrusion-molding system does not require ovens to pre-heat the material and operators to move the heated sheets to the mold. Since the operator controls the compounding ratios as desired, nearly infinite flexibility is added to the process, including the ability to alter properties while molding or to create a gradual change in color, for example. Also, unlike sheet molding, the extrusion-molding system does not require the material to have a melt-strength, giving the system added flexibility. In one embodiment, the extrusion-molding system may utilize thermoset resins to produce the structural parts. The extrusion-molding system may also use a variety of fiber materials, including carbon, glass and other fibers as described above, for reinforcement with achievable fiber volume fractions of over 50 percent and fiber lengths of one to four inches or longer with 85 percent or higher of the fiber length being maintained from raw material to finished part.

Deposition Process

The extrusion system, according to the principles of the present invention, allows for variable composite material lay-down; in regions of the mold where more material is to be utilized for deep draft or hidden ribs, for example, thereby minimizing force utilized during molding and pressing. The variable composite material lay-down results in more accuracy, fuller molds, and fewer "short-shots" as understood in the art than with typical compression molding processes. Variable lay-down also allows for large features to be molded on both sides of the structural part, as well as the placement of inserts or cores into the structural part. Lastly, since the material has a relatively very low viscosity as it is being deposited in a molten state onto the mold (as opposed to being pre-compounded into a sheet and then pressed into a mold), fibers are able to easily enter ribs and cover large dimensional areas without getting trapped or becoming undesirably oriented.

Low-Pressures

The thermoplastic composite material being deposited during the extrusion-molding process is much more fluid than that from a heated pre-compounded sheet, thus allowing the thermoplastic composite material to flow much easier into the mold. The fluidity of the composite material being deposited onto the mold results in significantly reduced molding pressure requirements over most other molding processes. Presses for this process generally operate in the range of 100 pounds per square inch, compared with 1,000 pounds per square inch of pressure used for compression molding. This lower pressure translates to less wear, thereby reducing maintenance on both the molds and the press. Because of the lower pressures, instead of needing a steel tool that could cost over $200,000, an aluminum mold, capable of 300,000 cycles, and may be manufactured for as little as $40,000. Less expensive tooling also means more flexibility for future design changes. Since the thermoplastic resin is relocated and formed on the face of the mold under lower pressures, less stress is locked into the material, thereby leading to better dimensional tolerance and less warpage.

Machine Efficiency

Because the extrusion-molding process may use two or more molds running at the same time, there is a reduction in the average cycle time per part, thus increasing productivity as the first mold set may be cooled and removed while a second mold is filled and compressed. Also, the extrusion-molding system utilizes minimal redundant components. In one embodiment, the extrusion system utilizes a separate press for each mold, but other equipment may be consolidated and shared between the mold sets and may be easily modified in software to accommodate other molds. The extrusion and delivery system 600a further may be integrated into current manufacturing facilities and existing compression molds and presses may be combined.

Figure 26:
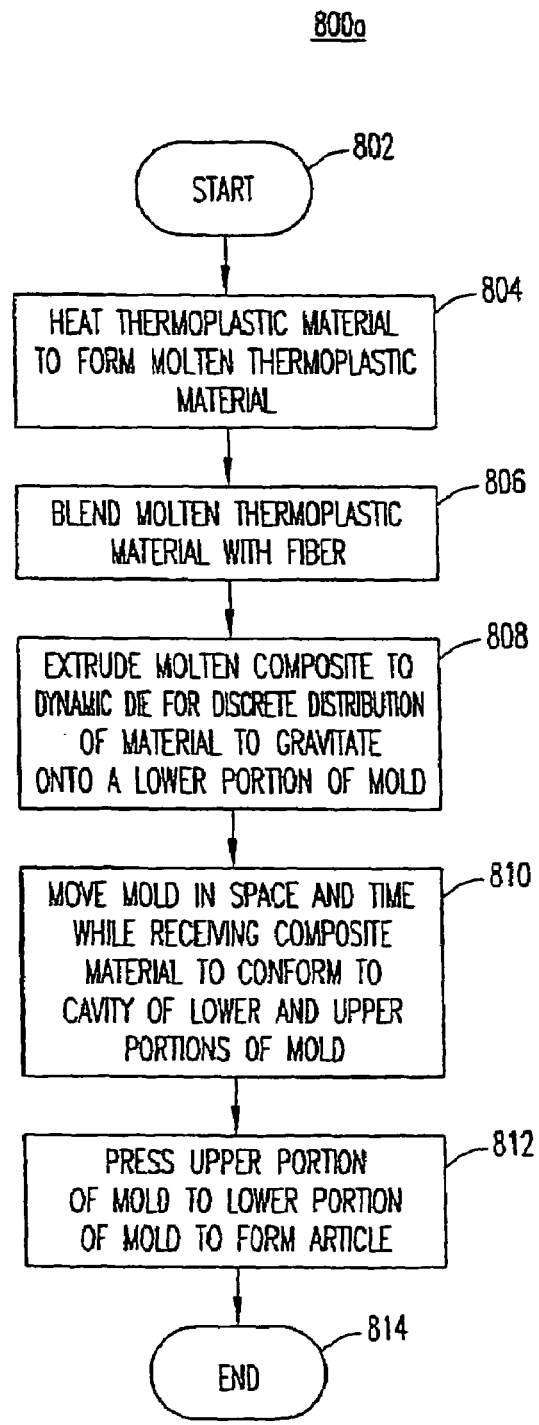
FIG. 26 is an exemplary flow diagram illustrating the extrusion-molding process utilized to form a panel by using either two- or three-axis control for depositing the thermoplastic material onto the lower mold of FIG. 23.

FIG. 26 is an exemplary flow diagram describing the extrusion-molding process that may be utilized to form articles or structural parts by using either two- or three-axis control for depositing the composite material onto the lower mold 626. The extrusion-molding process starts at step 802. At step 804, the thermoplastic material is heated to form molten thermoplastic material and blended with the fiber at step 802 to form a composite material. At step 708, the molten composite material is delivered through the dynamic die to gravitate onto a lower mold 626. For the two-axis extrusion deposit process, a fixed output from the die may be utilized. In a two-axis process, the movement of the trolley is maintained at a constant speed. In a three-axis extrusion control process, a dynamic die 606 may be utilized in conjunction with varying trolley or mold speeds. For both the two- and three-axis extrusion control process, the lower mold 626 may be moved in space and time while receiving the composite material to conform the amount of composite material required in the cavity 630 defined by the lower and upper molds 626 and 632 at step 810. At step 812, the upper mold 632 is pressed to the lower mold 626 to press the composite material into the lower and upper molds 626 and 632. The process ends at step 814.

Figure 27:
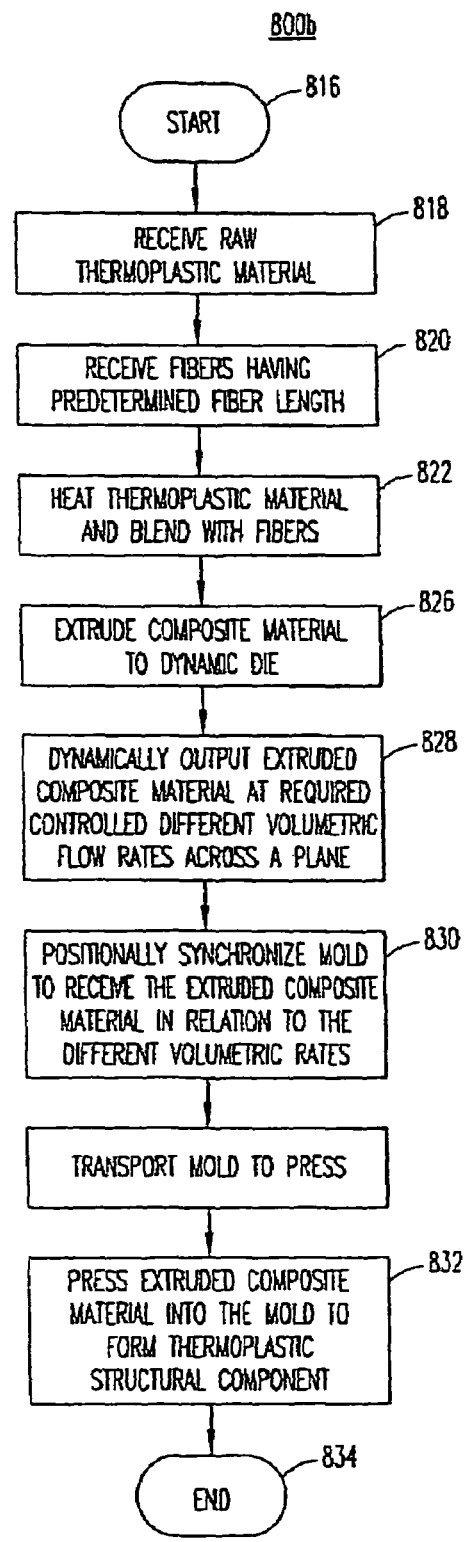
FIG. 27 is another exemplary flow diagram illustrating the extrusion-molding process utilized to form a panel by using the three-axis control for depositing the thermoplastic material onto the lower mold of FIG. 23.

FIG. 27 is an exemplary flow diagram for producing structural parts utilizing the extrusion-molding system 600a of FIG. 23 via the three-axis control extrusion-molding process. The structural part production process starts at step 816. At step 818, thermoplastic material is received. The thermoplastic material is heated at step 822. In one embodiment, the thermoplastic material is heated to a melted or molten state. At step 820, fibers having a predetermined fiber length are received. At step 822, the fibers are blended with the heated thermoplastic material to form a composite material. The fibers may be long strands of fiber formed of glass or other stiffening material utilized to form large structural parts. For example, fiber lengths of one-half inch (½") up to four inches (4") or more in length may be utilized in forming the structural parts.

The composite material is extruded at step 826. In the extrusion process, the auger 620 or other mechanism utilized to extrude the composite material is configured to substantially avoid damaging the fibers such that the original fiber lengths are substantially maintained (e.g., 85 percent or higher). For example, in the case of using a screw type auger 620, the thread spacing is selected to be larger than the length of the fibers, thereby substantially avoiding damaging the fibers.

At step 828, the extruded composite material 625 may be dynamically output at different volumetric flow rates across a plane to provide for control of depositing the extruded composite material 625 onto the lower mold 626. The lower mold 626 may be positionally synchronized to receive the extruded composite material 625 in relation to the different volumetric flow rates across the plane P at step 830. In an embodiment, the positional synchronization of the mold 626 is performed in accordance with flow control elements 624 that are located at a height d above the trolley 608, which may be translated at a substantially constant or adjustable rate. For example, to deposit a constant or flat extruded composite material layer 628, the trolley 608 is moved at a substantially constant rate, but to increase or decrease the volume of the extruded composite material layer 628, the trolley 608 may be moved at a slower or faster rate, respectively. At step 832, the extruded composite material 625 that is formed into the extruded composite material layer 628 is pressed into the mold 626 to form the thermoplastic structural part. The structural part forming process ends at step 834.

Figure 28:
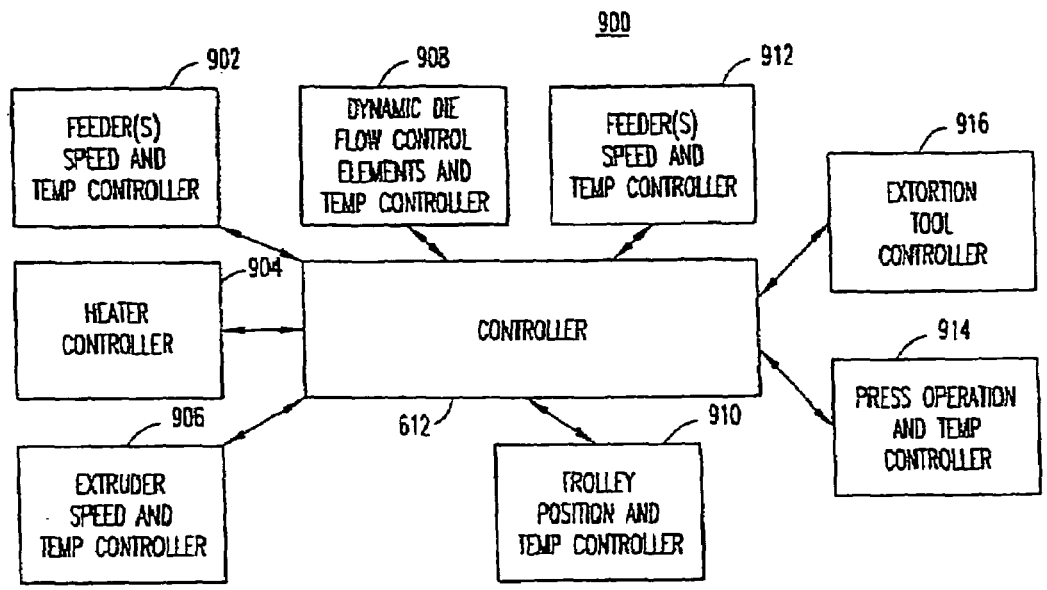
FIG. 28 is an exemplary block diagram of a controller interfacing with controllers operating in components of the extrusion-molding system of FIG. 23.

FIG. 28 is an exemplary block diagram 900 of the controller 612 as configured to communicate with controllers operating within components of the extrusion system 600a of FIG. 23. The controller 612 communicates with the various controllers for bi-directional communication using digital and/or analog communication channels as understood in the art. The controllers operating within the components may be processor based operating open or closed-loop control software as understood in the art and operate as slave computers to the controller 612. Alternatively, the controllers may be non-processor based controllers, such as analog or digital circuitry, that operate as slave units to the controller 612.

The feeder(s) 614 may comprise a speed and temperature controller 902 that is operable to control speed and temperature of the feeder(s) 614 for mixing the composite material M1 and fiber material M2. The feeder speed and temperature controller(s) 902 may be formed of single or multiple controllers to control motor(s) and heater(s). The controller 612 is operable to specify or command the velocity or rate and temperature of the feeder(s) 614, while the speed and temperature controller 802 of the feeder(s) 614 is operable to execute the commands received by the controller 812. For example, based on the amount of composite material being extruded via the dynamic die 606, the controller 612 may increase the rate of the materials M1 and M2 being fed into the extruder 606.

The controller 612 is further in communication with the heater controller 904. The controller 612 may communicate control data to the heater controller 904 based on feedback data received from the heater controller 904. For example, if the temperature of the heater controller 904 decreases during feeding operations, then the controller 612 may issue commands via the control data 1018 to the heater controller 904 to increase the temperature of the heater 618. Alternatively, the heater controller 904 may regulate the temperature utilizing a feedback regulator loop as understood in the art to the temperature commanded by the controller 612 and simply report the temperature to the controller 612 for monitoring purposes.

The controller 612 is further in communication with an extruder speed and temperature controller 906, which provides control over the speed of the auger 620 and temperature of the extruder 604. The extruder speed and temperature controller 906 may be operable to control multiple heaters within zones of the extruder 604 and communicate the temperatures of each heater to the controller 612. It should be understood that the extruder speed and temperature controller 906 may be formed of multiple controllers.

The controller 612 is further in communication with a dynamic die controller 908 that controls the flow control elements 624 of the dynamic die 606. The dynamic die controller 908 may operate to control each of the flow control elements 624 collectively or individually. Alternatively, each flow control element 624 may be individually controlled by separate controllers. Accordingly, the controller 612 may operate to issue commands to the dynamic die controller 908 to set the position for each of the flow control elements 624 in an open-loop manner. For example, a stepper motor may be utilized in an open-loop manner. Actual position of each flow control element 624 may be communicated back to the controller 612 via the feedback data 1022 for the controller 612 to utilize in controlling the positions of the flow control elements 624.

The controller 612 is further in communication with a trolley controller 910 that is coupled to the trolley 608 and is operable to control position of the trolley 608 and temperature of the lower mold 626. The controller 612 may provide control signals 1018 to the trolley controller 910 that operates as a servo to drive the trolley 608 to the positions commanded by the controller 612, which, in the case of depositing the extruded composite material 625 onto the lower mold 626, positions the lower mold 626 accordingly. Although the extruded composite material layer 628 that is deposited onto the lower mold 626 is molten at the time of deposition, the extruded composite material layer 628 deposited first tends to cool as the later extruded composite material 625 is being deposited. Therefore, the controller 612 may communicate control data 1018 to the trolley controller 910 to maintain the temperature of the extruded composite material layer 628, either at a substantially constant temperature, based on time of deposition of the extruded composite material 625, and/or based on other factors, such as thermoplastic material M1 molten state temperature requirements. Feedback data 1022 may provide current temperature and status of the position and velocity of the trolley 608 and temperature of the lower mold 626 so that the controller 612 may perform management and monitoring functions.

The controller 612 is further in communication with a heat/cool controller 912, which is operable to control temperature of heaters and/or coolers for the extrusion-molding system 600a. The heat/cool controller 912 may receive the control data 1018 from the controller 612 that commands the heat/cool controller 912 to operate at a specific or variable temperature based on a number of factors, such as thermoplastic material Ml; ambient temperature, characteristics of structural part being produced, production rates, etc. The heat/cool controller 912 may control system-level heaters and coolers or component-level heaters and coolers. Feedback data 1022 may provide current temperature and status of the heaters and coolers so that the controller 612 may perform management and monitoring functions.

The controller 612 is further in communication with a press controller 914, which is operable to control press operation and temperature of the upper mold 632. The press controller 914 may be a standard controller that the manufacturer of the press 610 supplies with the press 610. Similarly, the press controller 914 may comprise a temperature controller to control the temperature of the upper mold 932. Alternatively, the temperatures controller may not be associated with the press controller 914 provided by the manufacturer of the press 910. Feedback data 612 may provide current position and force of the press and temperature of the upper mold 632 so that the controller 612 may perform management and monitoring functions.

The controller 612 is further in communication with an extraction tool controller 916 that is operable to control extraction operations on a molded structural component. In response to the controller 612 receiving notification from the press controller 914 that the press 610 has completed pressing operations, the controller 612 may issue control signals 1018 to the extraction tool controller 916 to initiate extraction of the molded structural component. Accordingly, feedback data 1022 may be utilized to indicate current operation of the extraction tool. If the feedback data 1022 indicates that the extraction tool is having difficulty extracting the molded structural component, an operator of the extrusion-molding system 600a may be notified that a problem exists with the extraction tool, the lower or upper molds 626 and 632, the press 610, the heater or cooler of the upper or lower mold 626 and 632, or other component or function of the extrusion-molding system 600a.

It should be understood that while the controller 612 may be configured to be a master controller for each of the components of the extrusion-molding system 600a, the controller 612 may be configured to manage the components in a more distributed controller manner. In other words, the controllers of the components may operate as more intelligent controllers that use the parameters of the structural parts being produced to compute operating and control parameters and less as servos that are commanded by the controller 612 to perform a function. It should be further understood that the controller 612 may be programmed to accommodate different mechanical configurations of the extrusion-molding system 600a. For example, if the extrusion-molding system 600a were configured such that the output of the extruder 606 translated or otherwise moved relative to a stationary lower mold 626, which may or may not be coupled to a trolley 608, then the controller 612 may be programmed to control the movement of the output of the extruder 606 rather than movement of the trolley 608.

Figure 29:
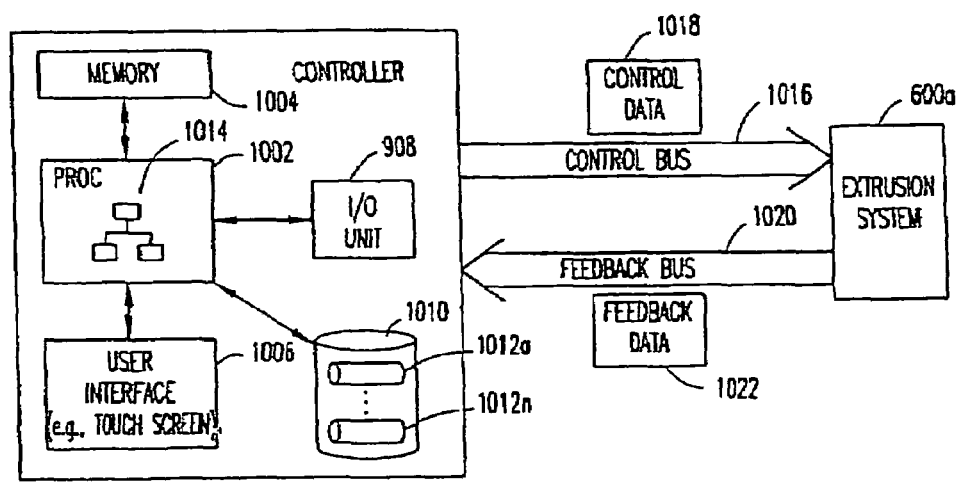
FIG. 29 is a more detailed exemplary block diagram of the controller of FIG. 28.

FIG. 29 is an exemplary block diagram of the controller 612 of FIG. 23. The controller 612 comprises a processor 1002 coupled to a memory 1004 and user interface 1006. The user interface 1006 may be a touch screen, electronic display and keypad, pen-based interface, or any other user interface as understood in the art. The processor 1002 is further coupled to an input/output (I/O) unit and a storage unit 1010 that stores information in databases or files 1012a-1012n (collectively, 1012). The databases 1012 may be utilized to store control parameters for controlling the extrusion-molding system 600a, such as data associated with the lower and upper molds 626 and 632. The databases 1012 additionally may be utilized to store data fed-back from the extrusion system 600a during operation thereof.

The processor 1002 is operable to execute software 1014 utilized to control the various components of the extrusion-molding system 600a and to manage the databases 1012. In controlling the extrusion-molding system 600a, the software 1014 communicates with the extrusion-molding system 600a via the I/O unit 1008 and control bus 1016. Control data 1018 is communicated via data packets and/or analog control signals across a control bus 1016 to the extrusion-molding system 600a. It should be understood that the control bus 1016 may be formed of multiple control busses, whereby each control bus is associated with a different component of the extrusion-molding system 600a. It should be further understood that the control bus 1016 may operate utilizing a serial or parallel protocol.

A feedback bus 1020, which may be a single or multiple bus structure, is operable to feedback data 1022 from the extrusion-molding system 600a during operation. The feedback data 1022 may be sensory data, such as temperature, position, velocity, level, pressure or any other sensory information measured from the extrusion-molding system 600a. Accordingly, the I/O unit 1008 is operable to receive the feedback data 1022 from the extrusion-molding system 600a and communicate the feedback data 1022 to the processor 1002 to be utilized by the software 1014. The software 1014 may store the feedback data in the database 1012 and utilize the feedback data 1022 to control the components of the extrusion-molding system 600a. For example, in the case of the temperature of the heater being fed-back by the heater controller 904 to the controller 612, if the temperature of the heater 618 becomes too low, then the controller 612 may issue a command via the control data 1018 to the heater 618 to increase the temperature thereof. The controller 612 or component (e.g., heater) may comprise an automatic control system as understood in the art for performing the control and regulation of the component.

In operation, the controller 612 may store control parameters for producing one or more structural parts by the extrusion-molding system 600a. For example, data associated with parameters of the molds 626 and 632, such as dimensions of the cavities 630, may be stored in the database 1012. By storing multiple sets of parameters for various structural parts, the extrusion-molding system 600a may be utilized to form the structural parts substantially simultaneously. The processor 1002 may execute the software 1014 with the different sets of parameters in parallel to form the structural parts substantially simultaneously. That is, when one structural part is being pressed, another may be formed via the dynamic die 606 by applying the extruder composite material 625 onto the lower mold 626.

Figure 30:
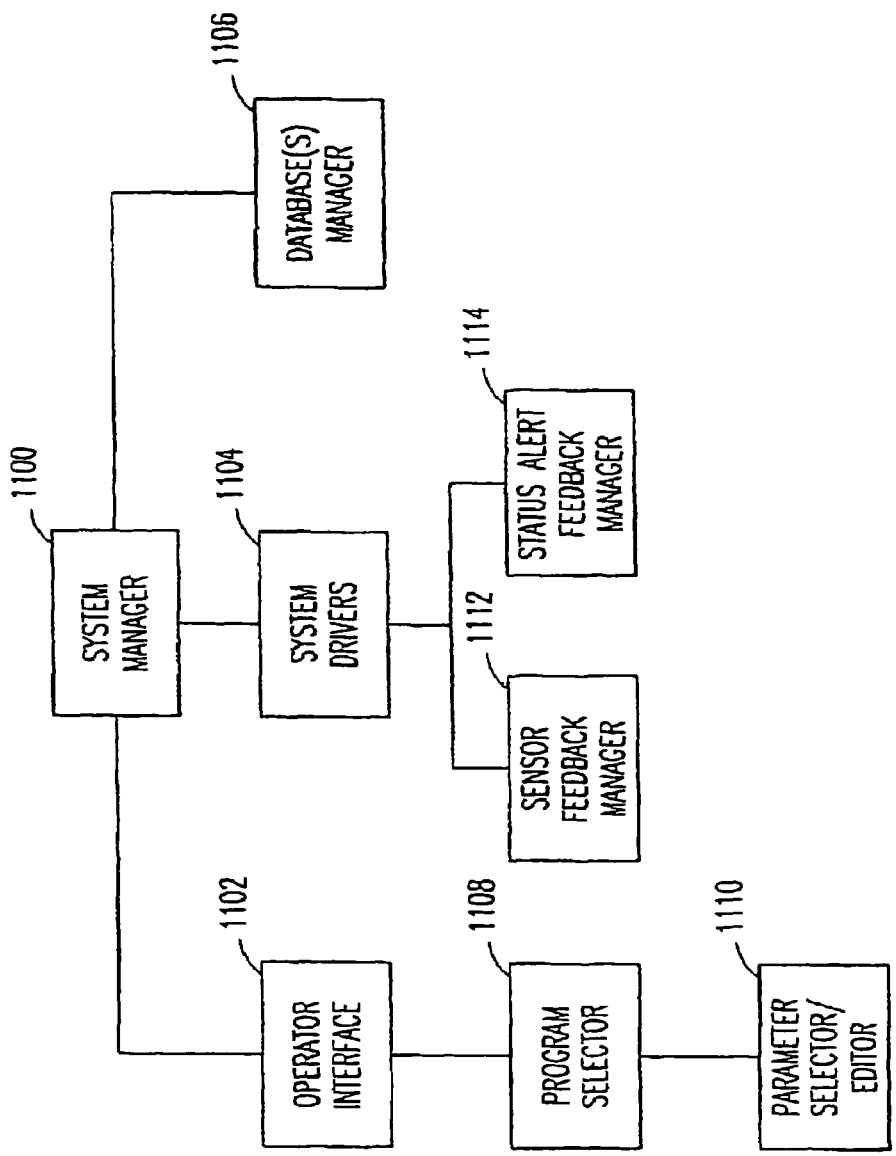
FIG. 30 is an exemplary block diagram of the software that is executed by a processor operating the controller of FIGS. 28 and 29.

FIG. 30 is an exemplary block diagram of the software 1014 that is executed by the processor 1002. A system manager 1100 is operable to manage various aspects of the controller 612. The system manager 1100 interfaces with an operator interface 1102, system drivers 1104, and a database manager 1106.

The operator interface 1102 is utilized to provide an interface for an operator of the extrusion-molding system 600a to control the extrusion-molding system 600a manually or establish programs and/or profiles for producing structural parts. The operator interface 1102 communicates with a program selector 1108, which, when previously programmed, allows the operator to select programs for producing the structural parts. For example, a program that is established to produce a pallet may be selected via the operator interface 1102 by an operator so as to control the extrusion-molding system 600a to produce the pallet as defined by a designer of the pallet in accordance with the lower and upper molds 626 and 632. In one embodiment, the program selector 1108 merely selects a generic program that produces specific structural parts by controlling the extrusion-molding system 600a by utilizing specific sets of parameters for controlling the components accordingly. The program selector 1108 may communicate with a parameter selector/editor 1110 that allows the operator to select a particular set of parameters to form a particular structural part and/or edit the parameters to alter the process for forming the structural part. The parameter selector/editor 1110 may interface with the database manager 1106 for selecting a particular set of parameters from a variety of different parameter datafiles available for the controller 612 to drive the components of the extrusion-molding system 600a to form different structural parts. For example, the database manager 1106 may have access to a set of parameters for producing a pallet, I-beam, backboard, etc. It should be understood that each of the components of the extrusion-molding system 600a may be controlled by generic drivers and that the parameters selected for producing a structural part may alter the behavior of each of the components of the extrusion-molding system 600a accordingly.

The system drivers 1104 may be utilized to integrate with the components of the extrusion-molding system 600a as understood in the art. For example, individual system drivers 1104 may be utilized to control the feeders 614, heater 618, extruder 604, dynamic die 606, trolley 608, and press 610. The system drivers 1104 may be customized by the operator of the extrusion-molding system 600a or be a generic driver provided by a manufacturer of a particular component, such as the press 610. During operation of the extrusion-molding system 600a producing a structural part, the system drivers 1104 may utilize the parameters selected to produce the structural part to drive the components of the extrusion-molding system 600a.

In controlling the components of the extrusion-molding system 600a, a database 1012 and status alert feedback manager 1114 are utilized to provide feedback control for each of the components of the extrusion-molding system 600a. For example, the heater 618 may feedback the actual temperature via a temperature sensor (not shown). Based on the measured temperature of the heater 618, a system driver 1104 utilized to control the heater 618 may increase or decrease the temperature of the heater 618 in accordance with the actual temperature measurement. Accordingly, other sensors may be utilized to feedback temperature, pressure, velocity, weight, position, etc., of each component and/or composite material within the extrusion-molding system 600a. In the case of a critical failure of a component, alerts may be fed-back to the controller 612 and detected by the status alert feedback manager 1114. If an alert is deemed to be a major failure, the system drivers 1104 may shut down one or more components of the extrusion-molding system 600a to prevent damage to hardware or personal injury to an operator. In response to such an alert, the system manager 1100 may trigger the operator interface 1102 to display the failure and provide notice as to corrective actions or otherwise.

Figure 31:
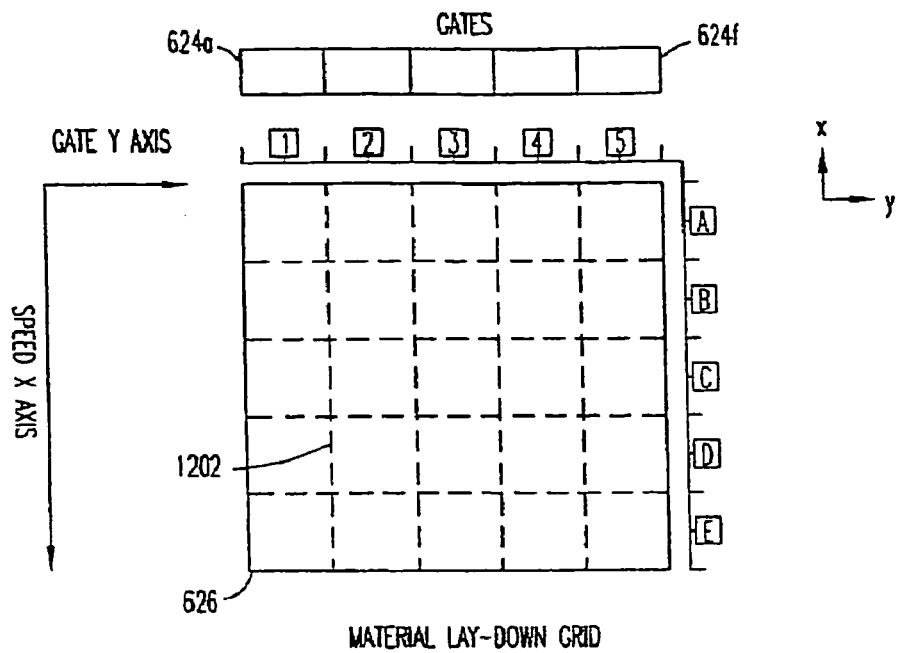
FIG. 31 is an exemplary schematic of the flow control elements and a lower mold, which is sectioned into a grid, to deposit extruded thermoplastic material in accordance with the extrusion-molding system of FIG. 23.

FIG. 31 is an exemplary schematic of the flow control elements 624a-624f and lower mold 626, which is sectioned into a grid 1202. The grid spacings are defined by the flow control elements 624 along the y-axis (identified as spacings 1-5) and defined by spacings a-e along the x-axis. It should be understood that a higher resolution for the grid may be attained by utilizing more flow control elements 624 along the y-axis and defining smaller spacings along the x-axis. Depending upon the particular structural part being formed, higher or lower resolutions may be desired and parameters established by the operator to define the higher or lower resolutions may be stored in the controller 612 via the database manager 1106 for use in producing the structural parts.

Figure 32:
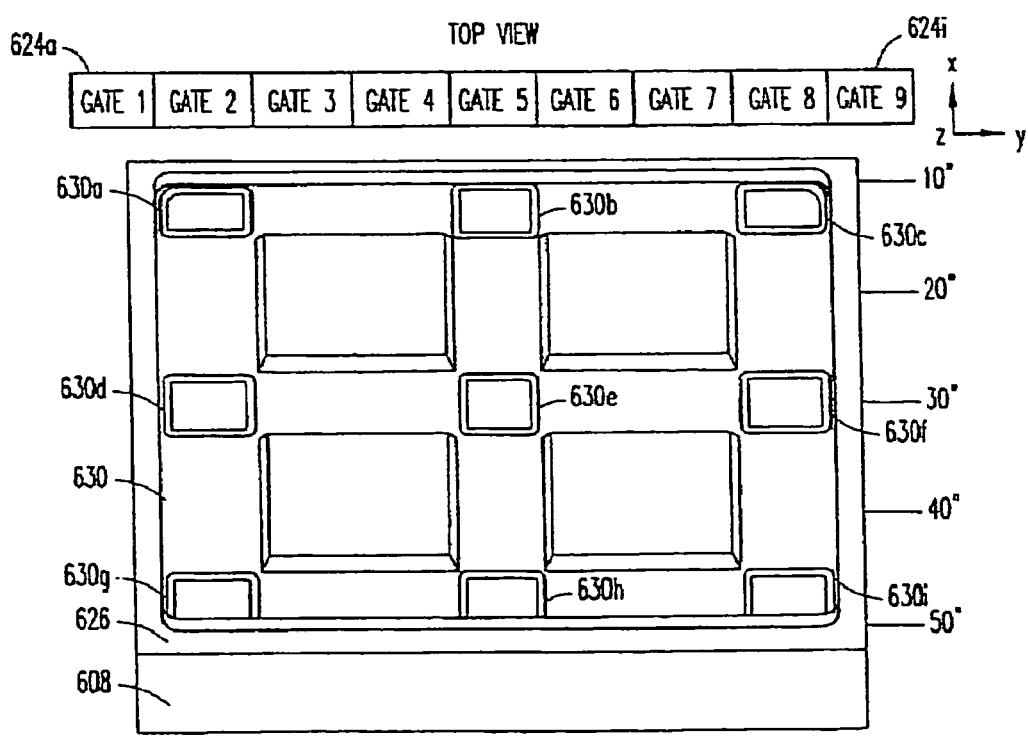
FIG. 32 is a top view of the flow control elements as aligned to deposit the thermoplastic material onto the lower mold of FIG. 23.

FIG. 32 is a top view of the flow control elements 624a-624i as aligned to deposit the composite material onto the lower mold 626 of FIG. 25. As shown, the flow control elements 624 are positioned along the y-axis, which provides for three-axis control for depositing the extruded composite material 625 onto the lower mold 626. Accordingly, the x-axis control for depositing the extruded composite material 625 may be provided by control of the movement of the trolley 608 at different speeds below the flow control elements 624, the y-axis control for depositing the extruded composite material 625 may be provided by the adjustment of the flow control elements 624, and the z-axis control for depositing the extruded composite material 625 may result from controlling the deposition of the extruded composite material 625 along the x- and y-axes.

Control for depositing the extruded composite material 625 along the x-, y-, and z-axes may be performed using a variety of techniques, including: (1) controlling the volumetric flow rate of the composite material from the extruder 604 via the rate of rotation of the auger 620; (2) controlling the rate of movement of the trolley 608 in a single axis; (3) controlling the aperture of the output of the extruder 604 having a single flow control element 624 or multiple flow control elements 624 operating uniformly; (4) individually controlling the multiple flow control elements 624; and (5) controlling motion of the trolley 608 in multiple axes. Each of these techniques assume that other variables are held constant. For example, technique (1) assumes that the output aperture of the extruder 604 is fixed and that the trolley 608 travels at a constant rate below the output aperture. Technique (2) assumes that the volumetric flow rate of the composite material from the extruder 604 is constant and that the output aperture of the extruder 604 is fixed. It should be understood, however, that the techniques may be combined to provide additional control of the placement of the extruded composite material 625 onto the lower mold 626 as discussed with regard to FIG. 25, where techniques (1), (2), and (4) are combined. Technique (5) comprises providing not only x-axis and y-axis control over lower mold 626, but also z-axis and rotation about any number of axes. By providing such control over the lower mold 626 using technique (5), a variety of structural parts may be formed that may not be possible otherwise. In sum, the overall computer control of the various elements of the inventive process serves a critical role in the coordination of the extrusion process and the production of a desired part and the overall operability of the process.

Finally, rather than controlling movement of the lower mold 626, the extruded composite material 625 may be deposited onto a stationary or moving lower mold 626 using moving output apertures from the extruder 604. For example, output apertures traveling along rails or other mechanical structure may be controlled to deposit the composite material in specific locations on the lower mold 626. An analogy for such a mechanism is a laser jet printer.

Referring again to FIG. 32, the flow control elements 624 are shown in relation to the lower mold 626 as it passes under the dynamic die 606 and the numbers of the right side correspond with the position of the trolley 608 in inches as it passes under the dynamic die 606. The lower mold 626 starts ten inches into the trolley 608 due to the lower mold 626 being smaller than the trolley 608. TABLES 3 and 4 below are exemplary tables that provide parameters for speed and gate control for the flow control elements 624. The parameters may be utilized to produce the panel utilizing the extrusion-molding system 600a.

TABLES 3 and 4 provide for the positional synchronization between the flow control elements 624 and the movement of the trolley 608. By orchestrating the movement between the two components (i.e., dynamic die 606 and trolley 608), the extruded composite material 625 may be deposited at positions along the lower mold 626 as specified by the volume of the cavities 630 of the lower and upper molds 626 and 632. In other words, the extruded composite material 625 is deposited onto the lower mold 626 to form the extruded composite material layer 628 thick enough to fill the cavities 630 of the lower and upper molds 626 and 632, thereby providing the ability to mold a panel 2000 with channels in a support structure as described above.

In addition to forming structural parts using thermoplastic materials and composite materials having fibers blended therein to provide strength in forming large parts, some structural parts further are structurally improved by having other components, such as attachments, fasteners, and/or stiffeners, inserted or embedded in certain regions. For example, connection system 2058 described above may be added to panel 2000.

Figure 33:
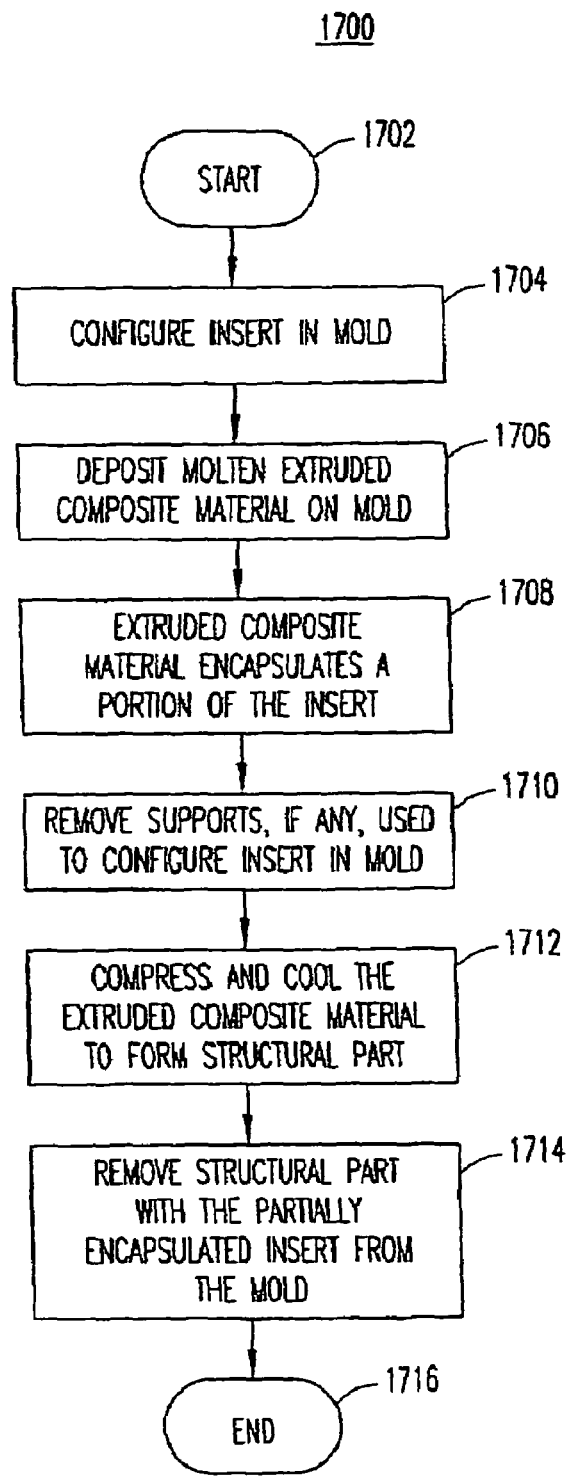
FIG. 33 is a representative flow diagram describing the operations for embedding an insert, such as a connecting system, support or other element into a structural part utilizing the extrusion-molding system of FIG. 23.

FIG. 33 is an exemplary flow diagram 1700 describing the operations for embedding or inserting an insert, such as a fastener, support, or other element, into a structural part utilizing the extrusion-molding system 600a of FIG. 25. The insertion process starts at step 1702. At step 1704, the insert is configured in either the lower or upper mold 626 or 632. At step 1706, the molten extruded composite material 625 is deposited on the lower mold 626. The extruded composite material is formed about at least a portion of the insert at step 1708 to secure the insert into the structural part being formed.

In one embodiment, the insert is encapsulated or completely embedded in the extruded composite material 625. Alternatively, only a portion of the insert is embedded in the sextruded composite material 625 so that a portion extends from the structural part.

At step 1710, if any supports are used to configure the insert in the lower 626 or upper 632 mold, then the supports are removed. The supports, which may be actuator controlled, simple mechanical pins, or other mechanism capable of supporting the insert during deposition of the extruded composite material 625 onto the lower mold 626, are removed before the extruded composite material layer 628 is hardened at step 1712. The extruded composite material layer 628 may be hardened by natural or forced cooling during pressing, vacuuming, or other operation to form the structural part. By removing the supports prior to the extruded composite material layer 628 being hardened, gaps produced by the supports may be filled in, thereby leaving no trace of the supports or weak spots in the structural part. At step 1714, the structural part with the insert at least partially embedded therein is removed from the mold 626 and 632. The insertion process ends at step 1716.

In another embodiment of the invention, an insert is encapsulated by a process of the claimed invention. In a manner analogous to the process described in FIG. 33, an insert, such as a fastener, support, or other element, may be encapsulated with extruded thermoplastic material utilizing the claimed extrusion-molding system. In other embodiments of the invention, multiple layers of material of varying thickness may be deposited one on top of the other utilizing the claimed extrusion-molding system. Specifically, a first layer of thermoplastic material is extruded into a lower mold, following which a second layer of the same or different thermoplastic material is layered on top of the first layer. In certain embodiments of the invention, an insert may be placed on top of the first extruded layer prior to or instead of layering the first layer with a second extruded layer. This form of "layering" can facilitate the formation of a structure having multiple layers of thermoplastic material, of the same or different composition, and layers of different inserted materials.

EXAMPLE

Panels according to the present invention were prepared using the compositions shown in Table 2 below.

TABLE 2

| Component | Weight Percent of Component | |
|---|---|---|
| | Composition A | Composition B |
| Phillips Sumika ATTN-080 Polypropylene copolymer | 94 | 90 |
| Phoenix Flame retardant | 4 | 7 |
| ACC Silver Gray 4365 colorant | 2 | — |
| ACC Grey White 5263 colorant | — | 3 |

The respective components of each composition were blended and extruded using a Sterling 4.5 inch, 36 to 1 barrel (250 hp) extruder at a temperature of about 49° C. (120° F.) to about 93° C. (200° F.). Each molten extrudate was molded using an EMC Thermoforming Machine (350 ton) molding apparatus using the control parameters set forth in Tables 3 and 4 below.

TABLE 3

Trolley Speed Control Parameters

| Zone | Control (%) | Rate (m/min) | Start Position (cm) | End position (cm) |
|---|---|---|---|---|
| 1 | 0.80 | 1.19 | 0.0 | 12.70 |
| 2 | 1.50 | 0.64 | 12.70 | 38.10 |
| 3 | 1.00 | 0.96 | 38.10 | 101.60 |
| 4 | 1.15 | 0.83 | 101.60 | 203.20 |
| 5 | 1.20 | 0.80 | 203.20 | |

TABLE 4

Flow Control Element Parameters

| Gate | Zone | Height (inches) | Start Position (inches) | End position (inches) |
|---|---|---|---|---|
| 1 | 1 | 0.0 | 0.0 | 99.0 |
| 2 | 1 | 0.0 | 0.0 | 99.0 |
| 3 | 1 | 1.0 | 0.0 | 20.0 |
| 3 | 2 | 0.50 | 20.0 | 85.0 |
| 3 | 3 | 1.00 | 85.0 | 99.0 |
| 4 | 1 | 0.75 | 0.0 | 35.0 |
| 4 | 2 | 0.65 | 35.0 | 80.0 |
| 4 | 3 | 1.00 | 80.0 | 99.0 |
| 5 | 1 | 0.0 | 0.0 | 99.0 |
| 6 | 1 | 1.00 | 1.00 | 15.0 |
| 6 | 2 | 0.60 | 15.0 | 85.0 |
| 6 | 3 | 1.00 | 85.0 | 99.0 |
| 7 | 1 | 0.0 | 0.0 | 99.0 |
| 8 | 1 | 0.75 | 0.0 | 35.0 |
| 8 | 2 | 0.65 | 35.0 | 80.0 |
| 8 | 3 | 1.00 | 80.0 | 99.0 |
| 9 | 1 | 1.00 | 0.0 | 20.0 |
| 9 | 2 | 0.50 | 20.0 | 85.0 |
| 9 | 3 | 1.00 | 85.0 | 99.0 |
| 10 | 1 | 0.0 | 0.0 | 99.0 |
| 11 | 1 | 0.0 | 0.0 | 99.0 |

A section of five to seven panels prepared from each on Compositions A and B, respectively, were interconnected and assembled and placed upon a floor support surface, for example, a grass or concrete floor support surface. The section of panels may comprise five to seven panels. A HYSTER fork lift, weighing a minimum 2722 kg (6000 lbs.) with an 1814 kg (4000 lbs.) load was driven across the section of panels at a minimum speed of 10 mph with at least 15 sharp braking stops and at least 15 turns for a period of at least 15 minutes. No separations, breaks or cracks in the panels other than normal elastic deformation stretching of the material used to construct the panels was visually observed after testing.

The present invention has been described with reference to specific details of particular embodiments thereof. It is not intended that such detailed descriptions be regarded as limitations upon the scope of the invention except insofar as and to the extent that they are included in the accompanying claims.

What is claimed is:

1. A panel system comprising:
   a. at least two molded panels, each panel comprising:
      i. a body comprising:
         1. a generally planar top surface; and
         2. a bottom surface; and
      ii. a plurality of supporting members extending from the bottom surface of the body to define a support structure comprising a top surface adjacent to the bottom surface of the body, a generally planar bottom surface and at least one edge extending therebetween, at least one central channel extending along a central x-axis of the support structure from a first portion of the edge to a second, opposing portion of the edge along the x-axis, and at least one additional channel intersecting the at least one central channel and extending along a y-axis of the panel from a third portion of the edge to a fourth, opposing portion of the edge along the y-axis, the y-axis being generally perpendicular to the x-axis,
   b. a connection system disposed within a portion of each of the at least two panels;
   c. wherein the at least two panels are interconnected by the connection system and the connection system comprises:
      i. a connecting member comprising:
         1. a first plate having a hole proximate a first end of the first plate;
         2. a support plate positioned generally parallel to the first plate and having a first hole located in a central region of the support plate such that the first hole is generally aligned with the hole of the first plate, and a second hole spaced apart from the first hole proximate a first end of the support plate; and
         3. a top plate positioned generally parallel to the support plate and having (1) a first hole located in a central region of the top plate such that the first hole of the top plate is generally aligned with the first hole of the support plate and the hole of the first plate, and (2) a second hole spaced apart from the first hole of the top plate proximate a first end of the top plate and generally aligned with the second hole of the support plate; and
      ii. a receiving member comprising:
         1. a first plate having a hole located in a central region thereof; and
         2. a second plate positioned generally planar to but spaced apart from the first plate, the second plate having a slot extending from a first end of the second plate into a central region of the second plate such that at least a portion of the slot in the central region of the second plate is generally aligned with the hole in the central region of the first plate; and
      iii. at least one connection system fastening member for connecting the connecting member and the receiving member together, thereby inhibiting relative movement between said connecting member and said receiving member,
   wherein a portion of the support plate of the connecting member is positioned between the first plate and the second plate of the receiving member such that the second hole of the support plate and the second hole of the top plate of the connecting member are aligned with the hole of the first plate of the receiving member and a portion of the slot of the second plate of the receiving member in the central region of the second plate of the receiving member, thereby allowing the connection system fastening member to be inserted through, the second hole of said top plate of said connecting member, a portion of the slot of said second plate of said receiving member, the second hole of said support plate of said connecting member, and the hole of said first plate of said receiving member; so as to inhibit relative movement of the connecting member and the receiving member in a plane generally parallel to, the top plate, the support plate and the first plate of said connecting member, and the second plate and the first plate of said receiving member.

2. The panel system of claim 1 wherein the at least two panels are floor panels for covering a floor support surface.

3. The panel system of claim 2 wherein the floor support surface is selected from the group consisting of concrete, ice, earth, wood, grass, metal, studs and combinations thereof.

4. The panel system of claim 1 wherein the at least two panels are wall panels for covering a wall support surface.

5. The panel system of claim 4 wherein the wall support surface is selected from the group consisting of dry wall, studs, brick, wood, metal and combinations thereof.

6. A method of connecting molded panels comprising the steps of:
   a. providing at least a first molded panel and a second molded panel, each molded panel comprising a body comprising a generally planar top surface and a bottom surface; and a plurality of supporting members extending from the bottom surface of the body to define a support structure comprising a top surface adjacent to the bottom surface of the body, a generally planar bottom surface and at least one edge extending therebetween, the support structure having at least one central channel extending along a central x-axis of the support structure from a first portion of the edge to a second, opposing portion of the edge along the x-axis, and at least one additional channel intersecting the at least one central channel and extending along a y-axis of the panel from a third portion of the edge to a fourth, opposing portion of the edge along the y-axis, the y-axis being generally perpendicular to the x-axis, wherein said first molded panel further comprises at least one connecting member, and said second molded panel further comprises at least one receiving member;
   b. aligning at least one connecting member and at least one receiving member such that a portion of a support plate of the connecting member is positioned between a first plate and a second plate of the receiving member such that a second hole of said support plate and a second hole of a top plate of the connecting member are aligned with a hole of the first plate of the receiving member and a portion of a slot of the second plate of the receiving member in a central region of the second plate of the receiving member; and
   c. inserting a connection system fastening member through, the second hole of said top plate of said connecting member, said portion of the slot of said second plate of said receiving member, the second hole of said support plate of said connecting member, and the hole of said first plate of said receiving member, so as to inhibit relative movement of the connecting member and the receiving member in a plane generally parallel to, the top plate, the support plate and the first plate of said connecting member, and the second plate and the first plate of said receiving member.

\* \* \* \* \*